United States Patent
Malvar et al.

(10) Patent No.: US 9,492,002 B2
(45) Date of Patent: Nov. 15, 2016

(54) COSMETIC APPLICATORS AND METHODS OF MANUFACTURE

(71) Applicants: Michael Malvar, Oceanside, NY (US); Thomas Jonas, New York, NY (US)

(72) Inventors: Michael Malvar, Oceanside, NY (US); Thomas Jonas, New York, NY (US)

(73) Assignee: Albea Services, Gennevilliers (FR)

( * ) Notice: Subject to any disclaimer, the term of this patent is extended or adjusted under 35 U.S.C. 154(b) by 0 days.

(21) Appl. No.: 14/259,878

(22) Filed: Apr. 23, 2014

(65) Prior Publication Data

US 2015/0305477 A1   Oct. 29, 2015

Related U.S. Application Data

(62) Division of application No. 11/893,150, filed on Aug. 14, 2007, now Pat. No. 8,746,258.

(60) Provisional application No. 60/838,973, filed on Aug. 16, 2006, provisional application No. 60/853,378, filed on Oct. 20, 2006.

(51) Int. Cl.
| | |
|---|---|
| *A45D 40/26* | (2006.01) |
| *A46B 9/02* | (2006.01) |
| *A46D 1/00* | (2006.01) |
| *B29C 45/00* | (2006.01) |
| *B29C 53/02* | (2006.01) |
| *B29D 21/00* | (2006.01) |
| *B29L 31/42* | (2006.01) |
| *B29L 21/00* | (2006.01) |

(52) U.S. Cl.
CPC ............ *A45D 40/265* (2013.01); *A45D 40/267* (2013.01); *A46B 9/021* (2013.01); *A46D 1/00* (2013.01); *B29C 45/0055* (2013.01); *B29C 45/0081* (2013.01); *B29C 53/02* (2013.01); *B29D 21/00* (2013.01); *A46B 2200/106* (2013.01); *A46B 2200/1053* (2013.01); *B29C 2045/0056* (2013.01); *B29L 2021/00* (2013.01); *B29L 2031/42* (2013.01)

(58) Field of Classification Search
CPC ............ A45D 40/262; A45D 40/264; A45D 40/265; B29C 53/02; A46B 9/021
See application file for complete search history.

(56) References Cited

U.S. PATENT DOCUMENTS 702,359 A * 6/1902 Durston ................ 15/104.19
3,998,235 A * 12/1976 Kingsford ................ 132/218

(Continued)

*Primary Examiner* — Rachel Steitz
(74) *Attorney, Agent, or Firm* — Cooper & Dunham LLP

(57) ABSTRACT

A molded plastic applicator for cosmetics, such as a mascara brush, including an integral molded plastic panel that lies substantially in a mold plane when formed and is bent out of the mold plane to surround an extended longitudinal axis when the applicator is assembled. A plurality of openings, or projections such as bristles, are formed in or on the panel so as to be oriented substantially in a common pull direction transverse to the mold plane when the panel lies in the mold plane and to be oriented substantially radially of the longitudinal axis in directions distributed around the axis when the panel is bent to surround the axis. A retainer holds the panel bent out of the plane in surrounding relation to the axis. The panel may be formed as a plurality of free-ended limbs, radiating from a hub through which the longitudinal axis extends, and bent down around the axis; alternatively, it may be generally rectangular as formed, and bent into a cylinder about the axis, or it may be formed as a band that is wound helically about the axis. A method of making the applicator includes steps of molding the panel, bending the panel about the axis, and retaining the panel in the bent configuration.

2 Claims, 28 Drawing Sheets

(56) References Cited

U.S. PATENT DOCUMENTS

| | | | |
|---|---|---|---|
| 4,545,393 A * | 10/1985 | Gueret et al. | 132/218 |
| 4,869,612 A | 9/1989 | Mooney et al. | |
| 5,722,436 A * | 3/1998 | Vandromme et al. | 132/218 |
| 5,951,113 A | 9/1999 | Lewis, Jr. | |
| 6,616,366 B1 | 9/2003 | Weihrauch | |
| 2008/0245382 A1 * | 10/2008 | Marciniak-Davoult et al. | 132/200 |

\* cited by examiner

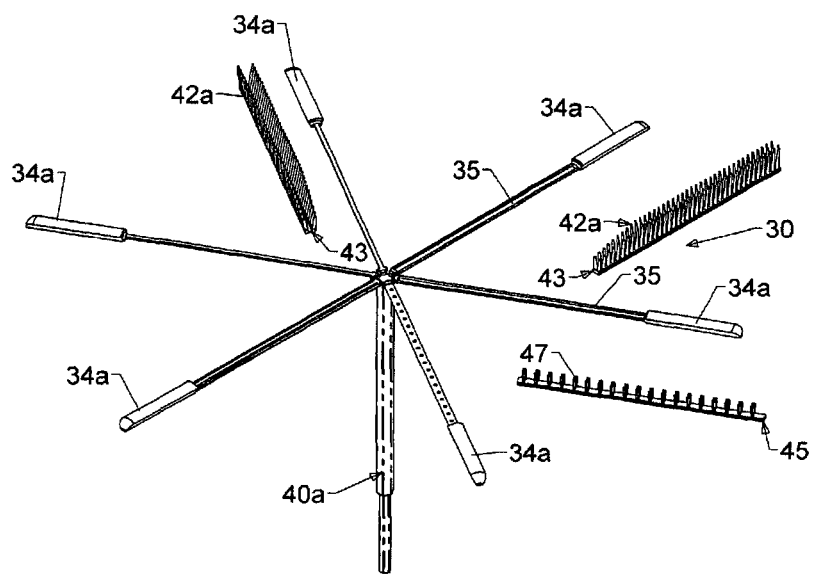
FIG. 8
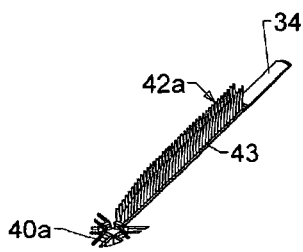
FIG. 9
FIG. 10
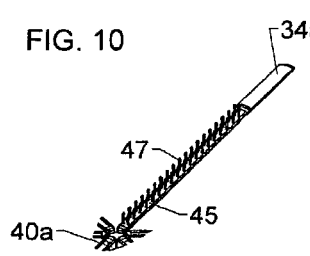
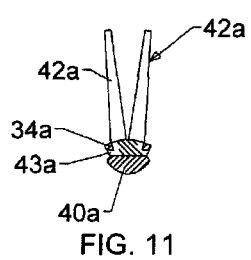
FIG. 11
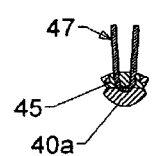
FIG. 12
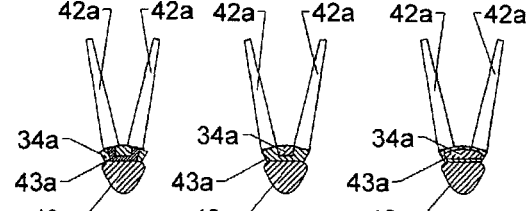
FIG. 11A  FIG. 11B  FIG. 11C

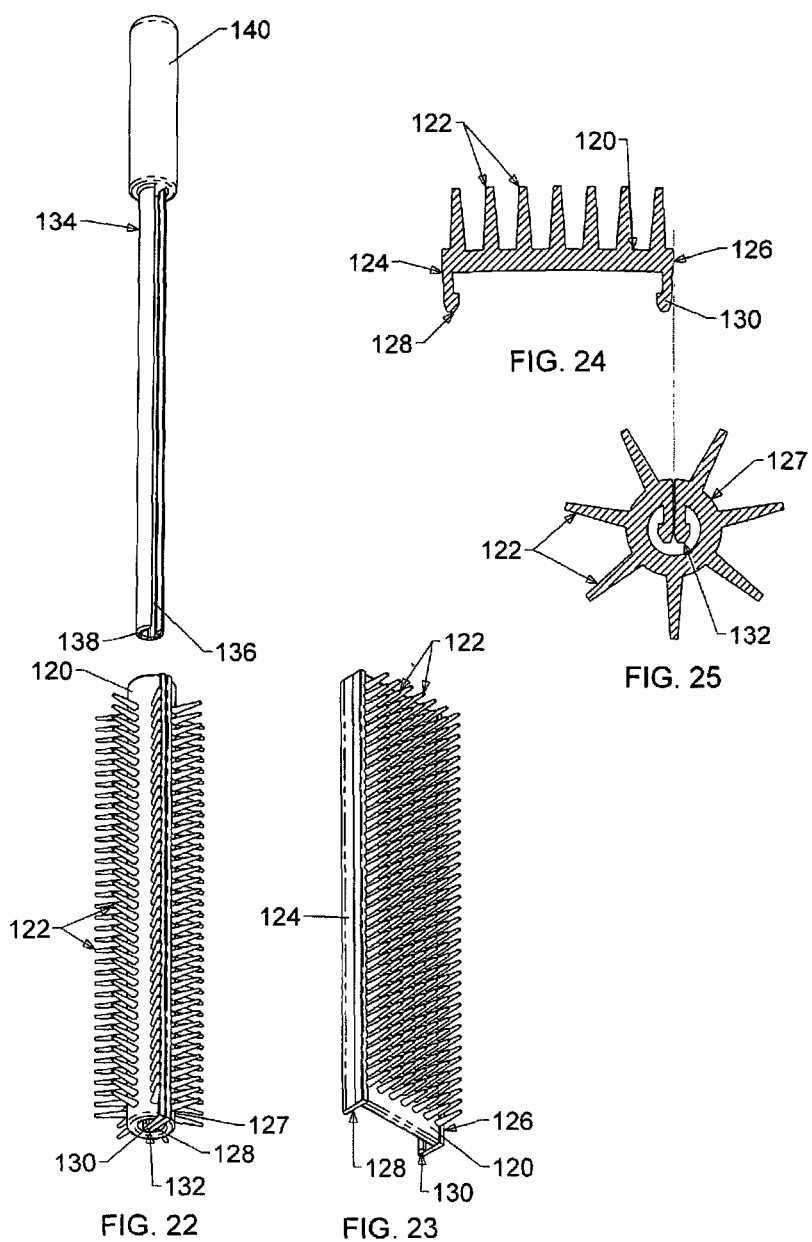

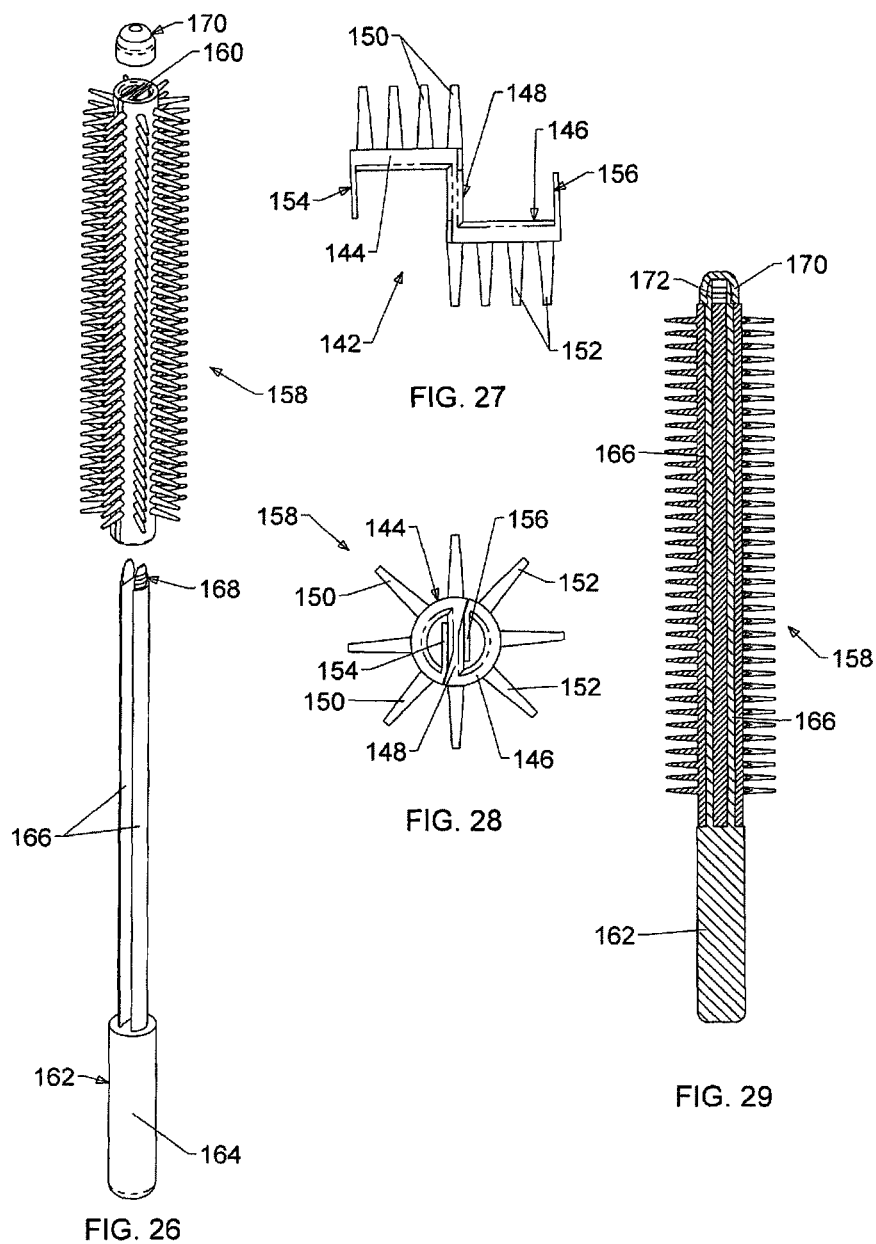

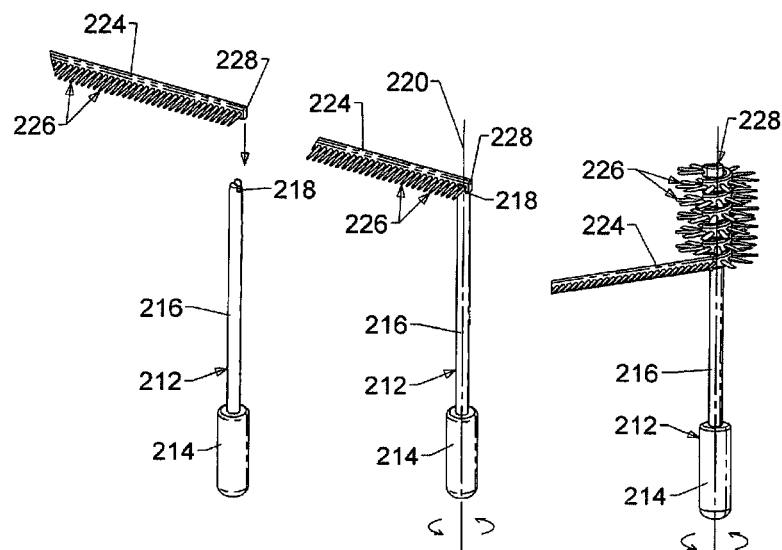
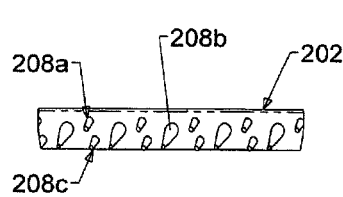
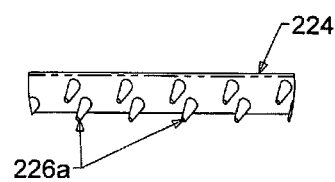
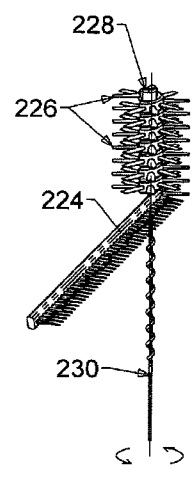

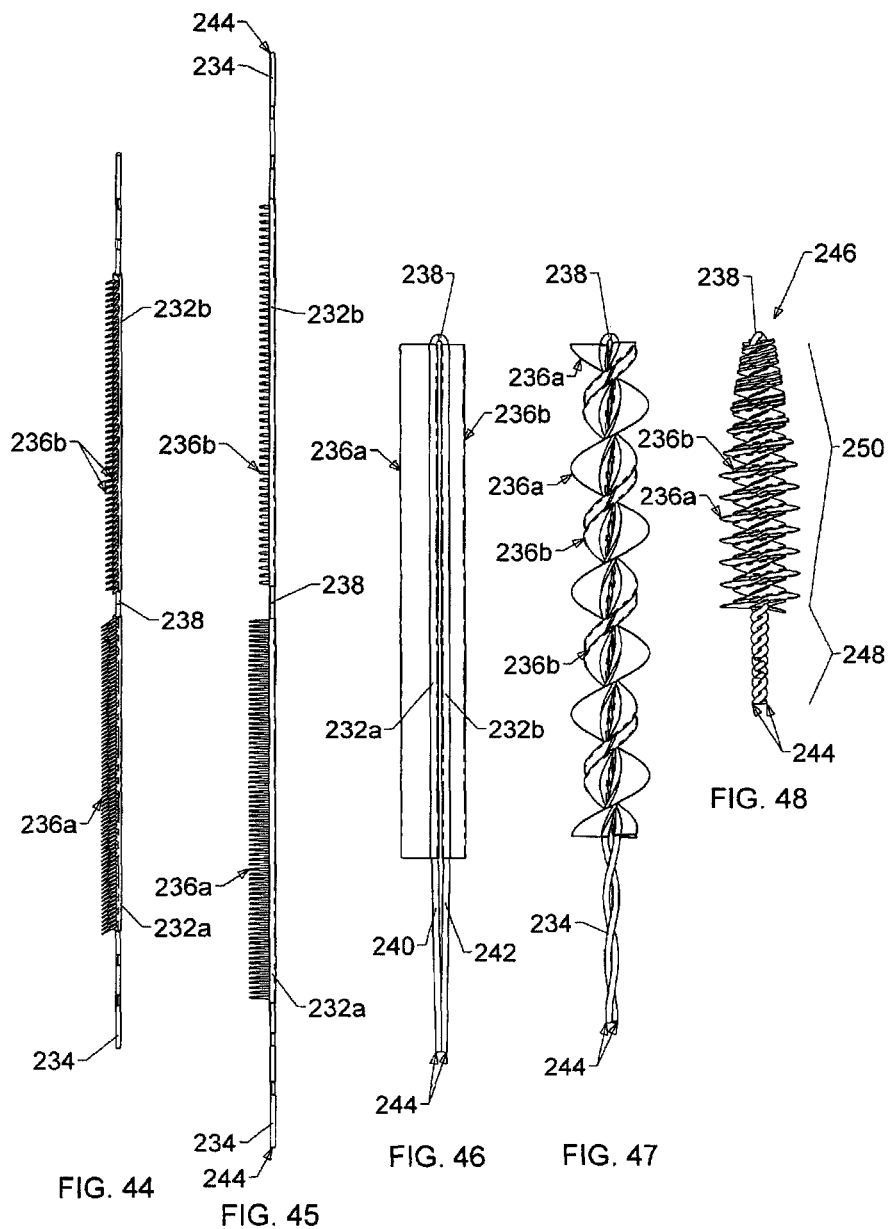

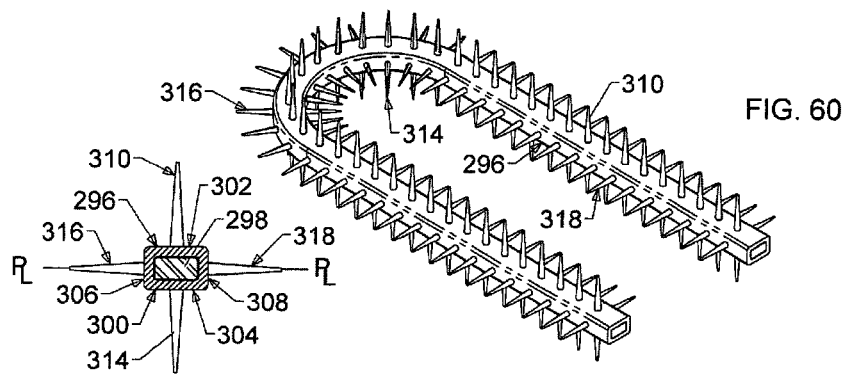
FIG. 60
FIG. 61
FIG. 62
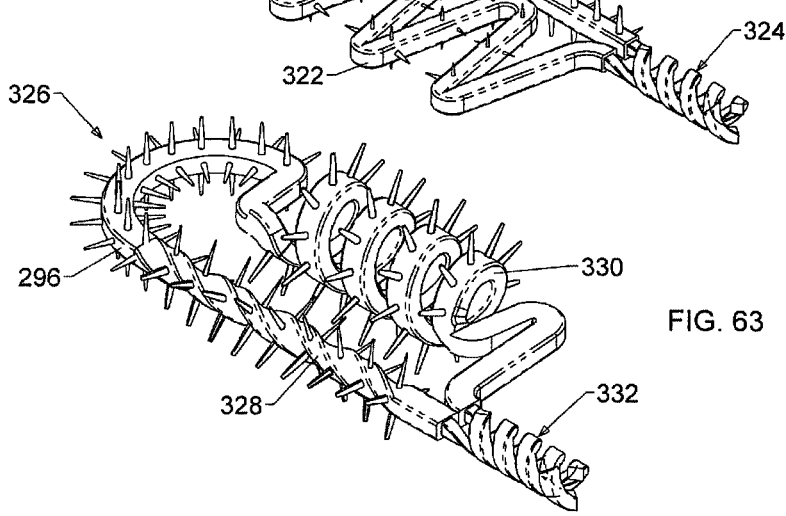
FIG. 63

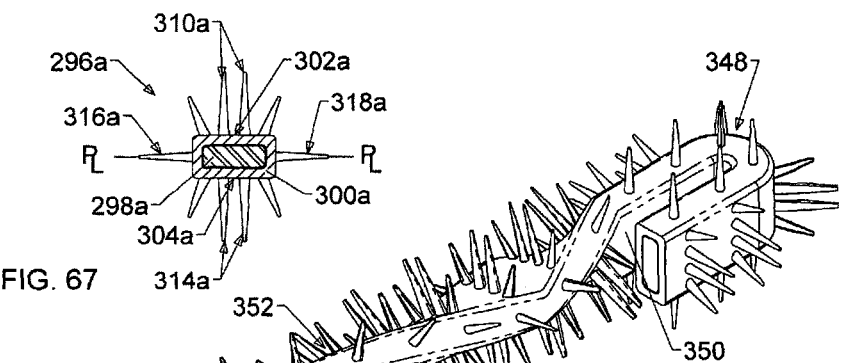
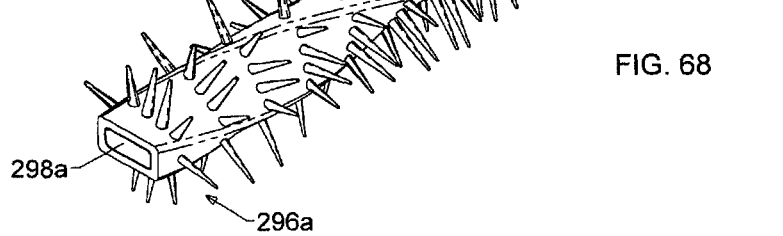
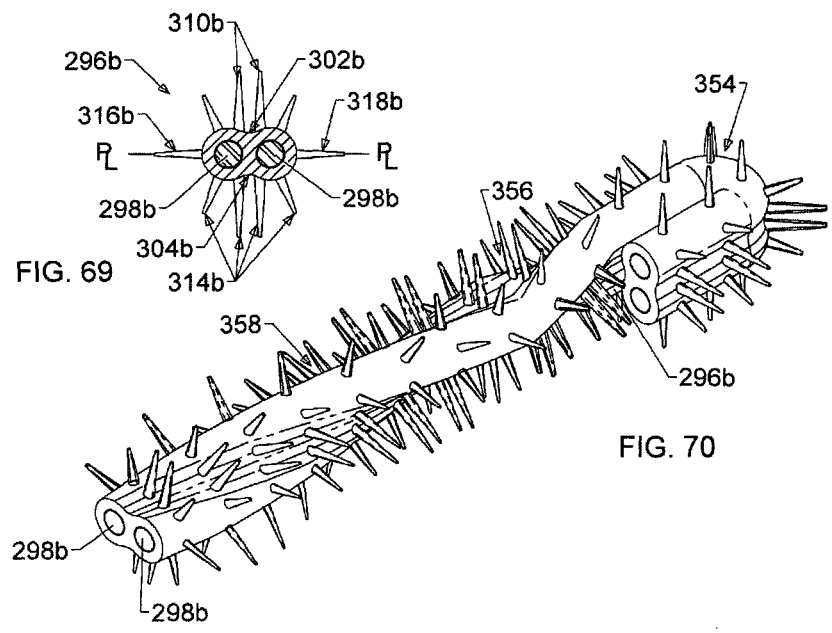

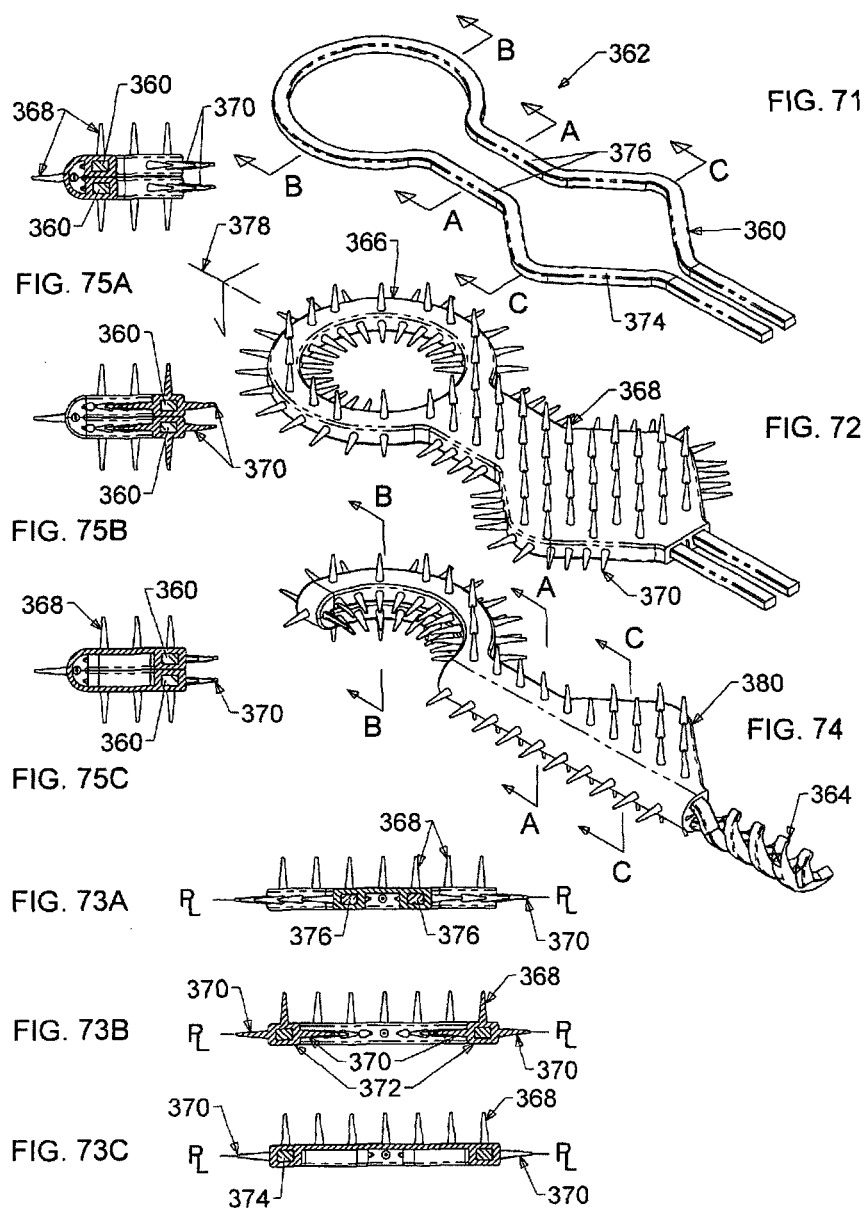

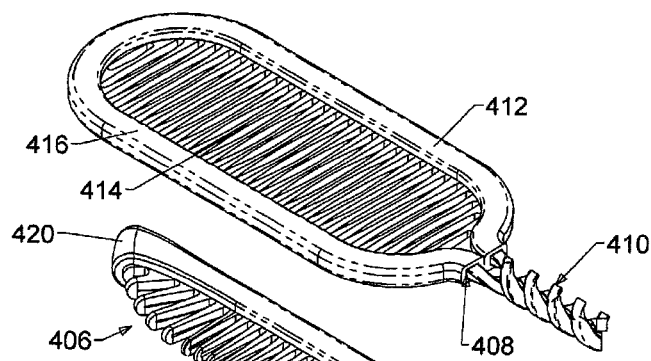
FIG. 84
FIG. 91
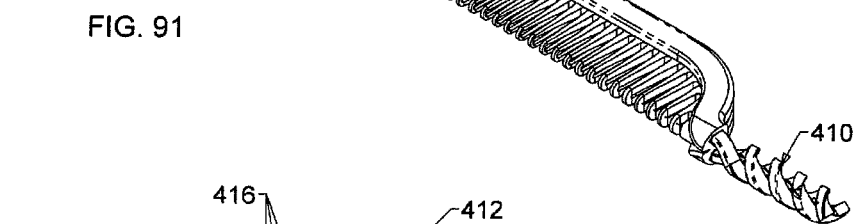
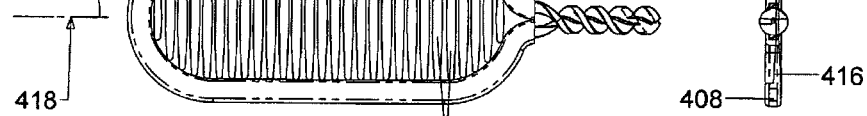
FIG. 85
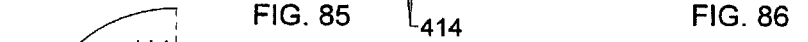
FIG. 86
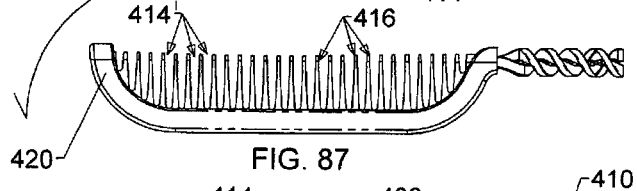
FIG. 87
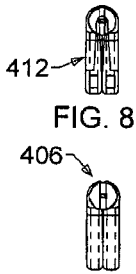
FIG. 88
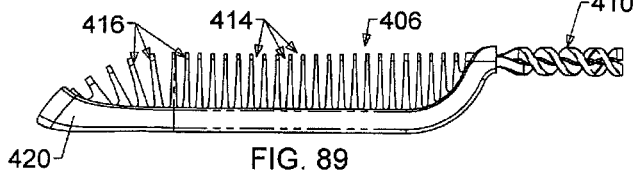
FIG. 89
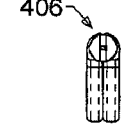
FIG. 90

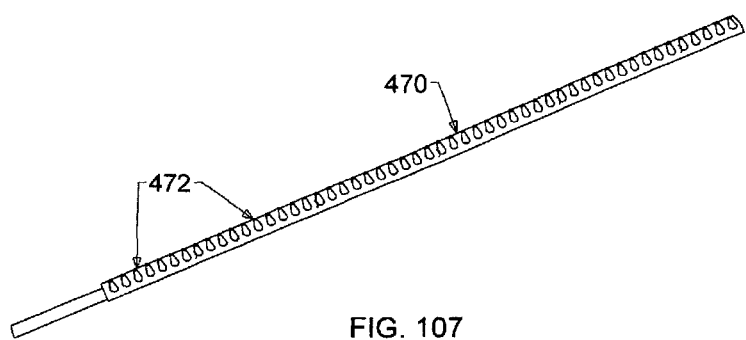
FIG. 107
FIG. 108
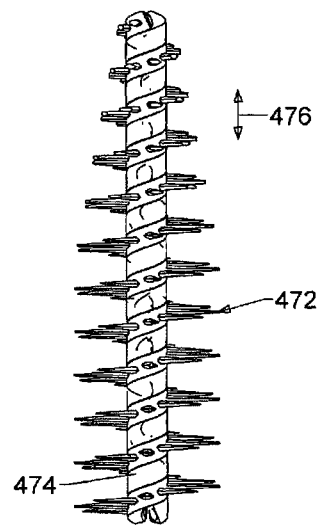

COSMETIC APPLICATORS AND METHODS OF MANUFACTURE

CROSS REFERENCE TO RELATED APPLICATIONS

This is a division of U.S. patent application Ser. No. 11/893,150 filed Aug. 14, 2007 (now allowed), which claims the benefit, under 35 U.S.C. §119(e), of U.S. provisional patent applications No. 60/838,973, filed Aug. 16, 2006, and No. 60/853,378, filed Oct. 20, 2006, the entire disclosures of all of which are incorporated herein by this reference.

BACKGROUND OF THE INVENTION

This invention relates to applicators for cosmetics, such as molded plastic applicators, and to methods of making them. In one important sense, to which detailed reference will be made herein for purposes of illustration but without limitation, the invention is particularly directed to brushes for applying mascara or the like.

Brushes of the type commonly referred to as "twisted-in-wire" brushes, constituted of fibers clamped at their midpoints in a twisted wire core, are well known and widely used in the cosmetics industry. Although acceptable for uses exemplified by the application of mascara, these brushes have certain disadvantages. They are relatively costly, and there are only a limited number of suppliers. Moreover, a conventional twisted-wire brush offers essentially only one kind of brush profile for use both to transfer mascara from a container to the face and to apply the mascara to the eyelashes. To improve application, it would be beneficial to provide mascara brushes having other structures; but the diversity of possible configurations of twisted-in-wire brushes is restricted by the requirement to trim the bristles in order to achieve desired shapes, and the difficulty of forming and positioning cutters to effect such trimming.

It has also been proposed heretofore to employ plastic brushes and combs as mascara applicators. Injection molded product suppliers are quite abundant, the cost of a molded brush can be less than that of a twisted-in-wire brush, and a wide variety of designs is theoretically possible. The production of molded plastic brushes with radiating bristles distributed around a cylindrical or like core, however, has been attended with substantial difficulties in separating the brush from the mold, owing to interference between the divergently angled brush fibers and the mold recesses provided for forming them, unless special and complex multi-part mold structures are employed.

SUMMARY OF THE INVENTION

The present invention, in a first aspect, broadly contemplates the provision of an applicator for cosmetics or the like, comprising a support element transformed from an extended configuration to a bent configuration; and a plurality of features comprising projections or openings or mixtures thereof, provided in an initial orientation relative to each other in or on the support element in the extended configuration, at least some of the features being reoriented relative to others of the features when the element is transformed into the bent configuration.

This construction, in which the support element is transformed from one configuration to another while at least some of the provided features are reoriented relative to each other, facilitates the utilization of manufacturing processes that afford a desirable diversity of shapes and arrangements of applicator features but have heretofore been attended with difficulties such as those discussed above.

As particularly exemplified by molded plastic applicators for cosmetics or the like, an applicator in accordance with the invention may comprise an integral molded plastic panel lying substantially in a mold plane when formed and bent out of the mold plane to surround an extended longitudinal axis; and a plurality of features formed in or on the panel, oriented substantially in a common pull direction transverse to the mold plane when the panel lies in the mold plane and oriented substantially radially of the longitudinal axis in directions distributed around the axis when the panel is bent to surround the axis. The term "features" embraces both projections and openings, and includes, without limitation, projections such as bristles, tines or fibers, as well as holes, cavities and slots. Further in accordance with the invention, in illustrative or preferred embodiments thereof, a retainer is provided, holding the panel bent out of the plane in surrounding relation to the axis.

The terms "mold plane" and "pull direction" are used herein with reference to conventional types of molds, such as injection molds, for producing plastic articles, characterized in having relatively movable shaped mold surfaces that face each other on opposite sides of a notional plane ("mold plane") and, in the course of a molding operation, move relatively toward and away from each other in a direction ("pull direction") perpendicular to the plane. When the mold plates are brought together, the respective shaped mold surfaces meet and cooperatively define a volume that is filled with plastic material, thereby to mold the material into an article having the configuration of the defined volume. The initial substantially planar configuration of the panel and the initial substantially parallel pull-direction orientation of the features formed therein or thereon, in the applicators of the invention, facilitates separation of the molded article from the applicator, while the subsequent bending of the panel around a longitudinal axis transforms the article into an applicator having, e.g., a generally cylindrical or conical core with features exemplified by bristles or fibers distributed all around and projecting generally radially from the core, in the illustrative case of a mascara brush or the like, thereby overcoming the difficulty of molding such brushes without need for complex molding equipment.

In particular embodiments, the panel comprises a plurality of relatively rigid portions interconnected by relatively flexible hinge portions to enable bending of the panel out of the mold plane to surround the longitudinal axis without substantial deformation of the relatively rigid portions.

Thus, the panel may include a hub portion in register with the longitudinal axis, which is transverse to the mold plane, and the relatively rigid portions may comprise a plurality of limbs extending radially from the hub portion when the panel is lying substantially in the mold plane, each limb having a free end and a second end, with the hinge portions respectively connecting the second ends of the limbs to the hub portion of the panel such that the limbs are bendable relative thereto so as to be parallel to and surround the axis. The limbs may respectively have surfaces facing away from the axis when the limbs surround the axis, and the features may be projections formed on and extending from the surfaces of the limbs. Alternatively, the features may be openings formed in and extending along the respective limbs, and the applicator may further include a plurality of projections formed in the openings by insert molding so as to extend away from the axis. The applicator of the invention, in these embodiments, may also include an elongated stem molded integrally with, and extending along the axis from, the hub portion such that the limbs when bent surround the stem; and the retainer may engage the free ends of the limbs to hold them in surrounding relation to the stem.

In other embodiments of the invention, the relatively rigid portions are parallel to each other and to the axis when the panel lies substantially in the mold plane, and the hinge portions are disposed between and parallel to the relatively rigid portions for bendably interconnecting adjacent ones of the relatively rigid portions. The features may be openings formed in the relatively rigid portions, with the applicator also including projections inserted in and extending outwardly through the openings when the panel surrounds the axis. To provide such projections, the applicator may have a second integral molded plastic panel lying substantially in a mold plane when formed and bent out of the last-mentioned plane to surround the longitudinal axis inwardly of the first-mentioned panel, the second panel bearing the projections.

In still further embodiments, the panel is sufficiently flexible so as to be bent around the aforesaid axis with substantially continuous surface curvature, and the features are projections formed on and extending outwardly from the bent panel. For instance, the panel may be initially formed as a rectangle which is bent into a substantially cylindrical configuration with two long edges of the panel parallel to each other and to the axis, and may be provided with relatively rigid members respectively extending along these long edges in abutting relation to each other when the panel is in the cylindrical configuration, the retainer comprising an element holding the rigid members together.

In additional embodiments, the panel comprises an elongated band having a surface, the features are projections extending from this surface, and the band is bent into a helix around the aforesaid axis with the projection-bearing surface facing outwardly. The retainer may include a substantially rigid core extending along the axis and engaging the band to support and maintain the helix, or it may comprise a wire extending longitudinally through the band, the wire being twisted helically to form and maintain the helix and the band being molded around the wire.

In another aspect, the invention embraces a method of making an applicator for cosmetics or the like, comprising providing a bendable support element in an extended configuration, providing in or on the support element, while the support element is in the first configuration, a plurality of features comprising projections or openings or mixtures thereof having an initial orientation relative to each other, and transforming the support element from the first configuration into a second configuration by bending to constitute a base or core of the applicator, thereby reorienting at least some of the features relative to others of the features.

Again as exemplified by the manufacture of molded plastic applicators, this method may comprise molding an integral and bendable plastic panel lying substantially in a mold plane and having a plurality of features formed in or on the panel and oriented substantially in a common pull direction transverse to the mold plane, these features being at least one of projections and openings; and bending the panel out of the plane to surround an extended longitudinal axis such that the features are oriented substantially radially of the axis in directions distributed around the axis. The panel may then be engaged by a retainer to hold the panel bent out of the plane and in surrounding relation to the axis.

Further, the invention embraces a molded plastic applicator for cosmetics or the like, comprising a molded plastic panel initially lying substantially in a mold plane and being transformed to a bent configuration at least partially out of the mold plane, and a plurality of features formed in or on the panel, initially oriented in at least one of (i) a substantially common pull direction transverse to the mold plane and (ii) the mold plane, at least some of the features being reoriented relative to others of the features when the panel is transformed to the bent configuration, and wherein any features initially oriented in the substantially common pull direction are projections or openings and any features initially oriented in the mold plane are projections.

In accordance with the invention, the panel can be molded around an elongated bendable and shape-holding insert, the panel initially lying substantially in a mold plane and being transformed to a bent configuration at least partially out of the mold plane by bending the insert to the bent configuration. In particular embodiments, the features are projections, the insert is a wire having opposed ends, and the panel is transformed into the bent configuration by a process comprising bending the wire into substantially a U shape having substantially parallel legs and twisting the legs about each other.

Also in accordance with the invention, the features can be projecting bristles configured (e.g., with noncircular cross-sections) so as to have greater flexibility in a first direction transverse to their lengths than in a second direction transverse to their lengths.

Further features and advantages of the invention will be apparent from the detailed description hereinafter set forth, together with the accompanying drawings.

BRIEF DESCRIPTION OF THE DRAWINGS

FIG. 8 is a view, similar to FIG. 5 but partly exploded, of a modified form of the applicator of FIG. 5;

FIGS. 9 and 10 are enlarged fragmentary perspective views illustrating two alternative types of projection-bearing inserts for the applicator of FIG. 8, mounted in a limb of the applicator;

FIG. 11 is a cross-sectional view of the limb-mounted insert of FIG. 9;

FIGS. 11A, 11B and 11C are similar views of modified structures of the limb-mounted insert of FIG. 9;

FIG. 12 is a cross-sectional view of the limb-mounted insert of FIG. 10;

FIG. 22 is an exploded perspective view of yet another embodiment of the applicator of the invention;

FIG. 23 is a perspective view of the panel of the applicator of FIG. 22, lying in a mold plane;

FIG. 24 is a cross-sectional view of the panel of FIG. 23, lying in the mold plane;

FIG. 25 is a cross-sectional view of the same panel, bent to surround an extended longitudinal axis;

FIG. 26 is an exploded perspective view of a still further embodiment of the applicator of the invention;

FIG. 27 is a cross-sectional view of the panel of the applicator of FIG. 26, lying in a mold plane;

FIG. 28 is a cross-sectional view of the panel of FIG. 27, bent to surround an extended longitudinal axis;

FIG. 29 is a longitudinal sectional plan view of the applicator of FIG. 26, fully assembled for use;

FIGS. 34, 35 and 36 are perspective views of a modified form of the applicator of FIG. 32, illustrating successive stages in assembling the applicator;

FIG. 37 is a view similar to FIG. 36 illustrating an alternative core structure for the applicator;

FIGS. 38 and 39 are enlarged fragmentary perspective views illustrating two exemplary arrangements of projections for the embodiments of FIGS. 32 and 34;

FIG. 44 is a somewhat schematic perspective view of the applicator of FIG. 40, with the panel lying in a mold plane, illustrating a particular bristle arrangement;

FIGS. 45, 46, 47 and 48 are schematic side views illustrating successive stages in bending the panel of the FIG. 40 applicator;

FIG. 60 is a simplified perspective view of another panel for use in making an applicator in accordance with the invention;

FIG. 61 is an enlarged cross-sectional view of the panel of FIG. 60;

FIGS. 62, 63, 64 and 65 are perspective views of various applicators made by bending the panel of FIG. 60;

FIG. 67 is an enlarged cross-sectional view of another panel for use in making an applicator in accordance with the invention;

FIG. 68 is a perspective view of the panel of FIG. 67;

FIG. 69 is an enlarged cross-sectional view of yet another panel for use in making an applicator in accordance with the invention;

FIG. 70 is a perspective view of the panel of FIG. 69;

FIGS. 71 and 72 are perspective views illustrating successive stages in formation of a still further panel for use in making an applicator in accordance with the invention;

FIGS. 73A, 73B and 73C are sectional views of the molded panel of FIG. 72, respectively taken as along lines A-A, B-B and C-C of FIG. 71;

FIG. 74 is a perspective view of an applicator embodying the invention, produced by bending or folding the panel of FIG. 72;

FIGS. 75A, 75B and 75C are sectional views respectively taken as along lines A-A, B-B and C-C of FIG. 74;

FIG. 84 is a perspective view of another panel for use in making an applicator in accordance with the invention;

FIG. 85 is a plan view of the panel of FIG. 84;

FIG. 86 is a cross-sectional view of the panel of FIG. 85;

FIG. 87 is a side view of the panel of FIG. 85 after performance of a first, folding step to transform the panel into an applicator embodying the invention;

FIG. 88 is a cross-sectional view of the panel of FIG. 87;

FIG. 89 is a side view of the panel of FIG. 85 after performance of a second, bending step to complete the transformation of the panel into the applicator;

FIG. 90 is a cross-section of the applicator of FIG. 89;

FIG. 91 is a perspective view of the applicator of FIG. 89;

FIG. 107 is an isometric view of a panel or band of the general type shown in FIG. 40, with a modified bristle configuration similar to that illustrated in FIGS. 104 and 105; and FIG. 108 is a schematic side view of an applicator embodying the invention, produced by transforming the band of FIG. 107 into a helix.

DETAILED DESCRIPTION

Figure 1:
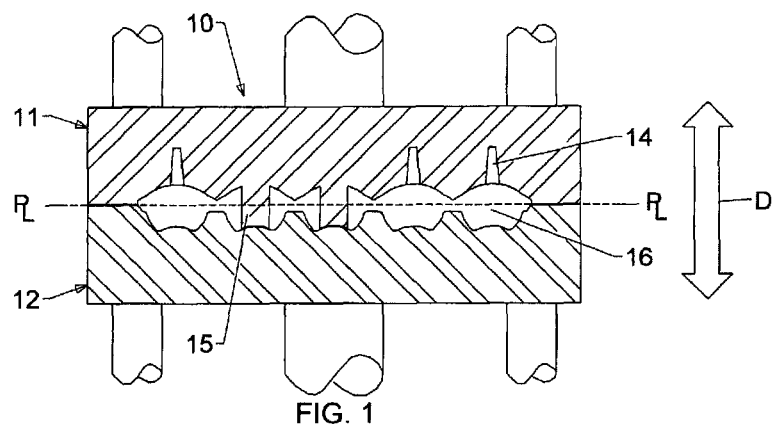
FIG. 1 is a highly simplified and schematic fragmentary elevational sectional view of a mold for forming a molded plastic article illustrative of the panel and associated features of the applicator of the present invention.

FIGS. 1-4 are schematic drawings illustrative of various terms and general relationships pertinent to the applicator and method of the present invention in certain embodiments thereof. In particular, FIG. 1 is a very simplified representation of pertinent features of an injection mold 10 of a generally conventional type suitable for use to produce molded plastic articles such as cosmetic applicators. The mold includes upper and lower mold plates 11 and 12 that are relatively movable toward and away from each other in a direction herein termed the "pull direction" and indicated by arrow D. The plates respectively have mold surfaces that face each other on opposite sides of a mold plane P which is perpendicular to pull direction D, the surfaces being configured as indicated at 14 and 15 to form projections and openings in the molded article. When brought together, the mold surfaces cooperatively define a mold cavity 16 to be filled with plastic material to be molded.

The article produced in mold 10 is an integral molded plastic panel 18 having the shape of the mold cavity 16 and lying substantially in the mold plane P when formed. Features such as projections 20 (e.g., bristles, tines or fibers) and/or openings 22 (e.g., cavities, holes, or slots) are formed on or in the panel, integrally therewith, in the molding process. In accordance with the invention, and as shown in FIG. 2, these features are all oriented substantially in a common pull direction transverse to the mold plane P when the panel lies in the mold plane; that is to say, in such condition of the panel, the directions $d_{20}$ in which projections 20 extend and the directions $d_{22}$ in which openings 22 open are all substantially parallel to the pull direction D perpendicular to the mold plane P.

By virtue of this arrangement, the mold plates are easily separated and the produced article is easily removed or pulled from the mold without being impeded by interference between shaped portions of the mold surfaces and features of the molded process. It is not essential that the as-formed panel be strictly planar or that the projections and/or openings be strictly parallel to each other and to the pull direction, so long as the extent of departure from planarity or parallelism does not cause difficulty in opening the mold and removing the molded article.

Figure 2:
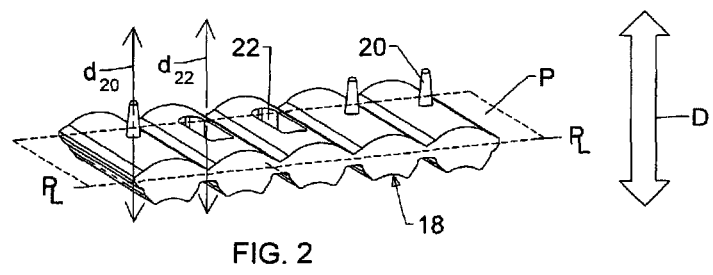
FIG. 2 is a similarly simplified schematic perspective view of a molded plastic article produced by the mold of FIG. 1, with the panel of the article lying in the mold plane.
Figure 3:
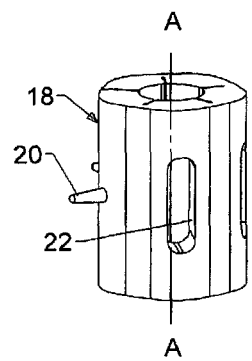
FIG. 3 is a perspective view of the article of FIG. 2 as bent to surround an extended longitudinal axis.
Figure 4:
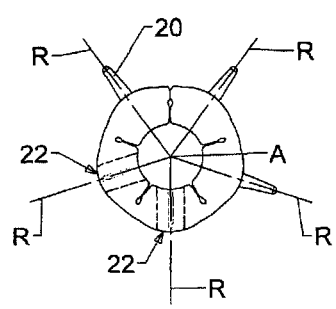
FIG. 4 is a cross-section of the article as bent in FIG. 3.

As shown in FIGS. 3 and 4, after being molded, the panel 18 is bent out of the mold plane so as to surround an extended longitudinal axis A, which is the axis of the final produced applicator. For example, the panel 18 of FIG. 2 is so shaped that it can be bent or curled into a substantially cylindrical shape with axis A as the geometric axis of the cylinder. When the panel is thus bent, the features (projections 20 and/or openings 22) are oriented substantially radially of the longitudinal axis A in directions distributed around the axis A. This arrangement is illustrated in FIG. 4, wherein lines R radiating from axis A (in a plane perpendicular thereto) at angularly spaced locations around the axis A are shown as coinciding with the directions in which projections 20 extend and the directions in which openings 22 open. Again, it is not essential that these directions strictly coincide with radii of the cylinder centered on axis A, so long as they are oriented in angularly different directions distributed around such a cylinder.

The article of FIGS. 2-4 exemplifies the way in which the present invention overcomes problems heretofore associated with the production of cosmetic applicators such as mascara brushes having fibers or bristles radiating outwardly around the circumference of a cylindrical or conical core, viz., by initially molding an extended, generally planar panel bearing features such as bristles or fibers oriented substantially parallel to each other for ease of separation from the mold, and then transforming the panel from an initial generally planar shape into a substantially cylindrical configuration wherein the fibers or bristles radiate outwardly at angles to each other around the periphery of the cylinder.

Figure 5:
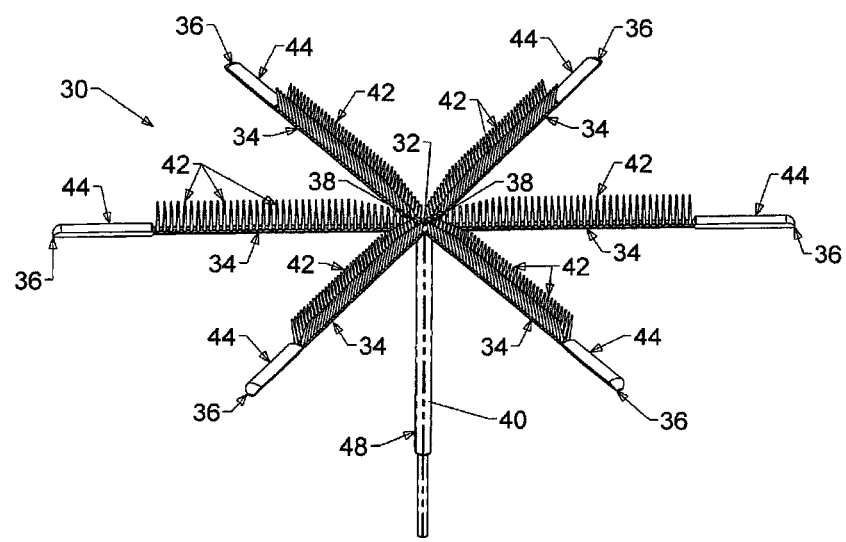
FIG. 5 is a perspective view of an applicator embodying the invention in a particular form, with the panel lying in a mold plane.
Figure 6:
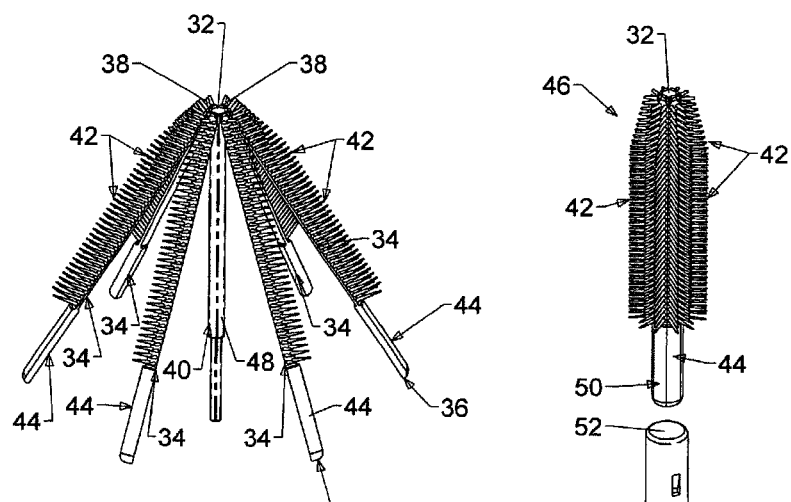
FIG. 6 is a perspective view of the applicator of FIG. 5 at an intermediate stage in bending the panel out of the mold plane.
Figure 7:
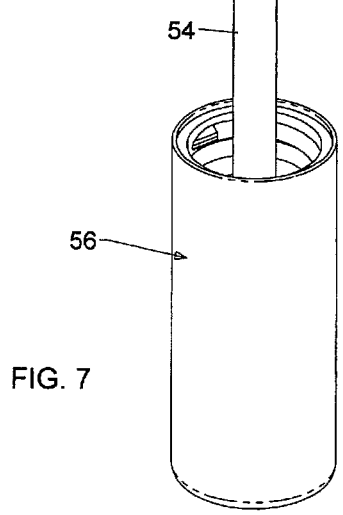
FIG. 7 is a perspective view, partly exploded, of the applicator of FIG. 5 with the panel fully bent to surround an extended longitudinal axis, also illustrating the retainer and handle of the applicator.

FIGS. 5-7 illustrate an embodiment of the applicator of the invention including a plastic panel 30 constituted of a small hexagonal central hub portion 32, six long narrow limbs 34 of equal length radiating outwardly from the hub portion with adjacent limbs spaced 60° apart and each having a free outer end 36, and six flexible hinge portions 38 respectively joining the hub portion to the inner ends of the six limbs. The hub portion is the upper end of an elongated rectilinear plastic stem 40 of hexagonal cross-section. In the as-molded condition of the panel, shown in FIG. 5, the hub portion, limbs and hinge portions lie substantially in a common plane (the mold plane), while the stem extends downwardly from the mold plane in the pull direction, with its longitudinal geometric axis substantially perpendicular to the mold plane. The hub, limbs, hinge portions and stem are molded integrally as a single unit.

Each of the limbs 34 has an upper surface bearing a multiplicity of bristles 42 projecting therefrom in a direction (the above-defined "pull direction") that is substantially perpendicular to the mold plane when the limbs are lying in the mold plane as shown in FIG. 5; in such condition, the bristles on all six limbs are substantially parallel to each other and also parallel to the aforementioned geometric axis of the stem. These bristles, illustrated as arranged in two parallel rows on each limb (although alternative arrangements may be used), occupy a major portion of the upper surface of each limb starting at the hinged inner end of the limb, but each limb also has a bristle-free outer portion 44 of the upper surface extending to the outer end 36. The bristles may be molded integrally with the panel 30 and stem 40, or (as explained below) they may be added to the panel limbs in a subsequent insert molding operation.

Since the as-molded panel 30 including the hub portion, limbs and hinge portions lies substantially in the mold plane, while the stem 40 (and the bristles 42, if formed in the same molding operation as the panel) are oriented substantially in the pull direction perpendicular to the mold plane in the as-molded condition of FIG. 5, the entire unit can be molded integrally in a generally conventional injection mold, and the mold plates can be opened and the produced unit separated therefrom without difficulty.

The substantially planar as-molded panel 30 of FIG. 5, with its attached stem 40, is transformed into an assembled applicator 46 shown in FIG. 7, suitable for use as a mascara brush, by bending the six limbs 34 downwardly relative to the hub portion 32 at their respective hinges until the limbs extend substantially parallel to, and snugly surround, the stem 40. An intermediate stage in this bending operation is illustrated in FIG. 6. During the course of assembly, each limb is bent through 90° from the mold plane about a bending axis, at its associated hinge portion, that is parallel to one of the six sides of the hub portion; and each limb ultimately overlies and abuts one of the six longitudinal faces 48 of the stem.

In the fully assembled condition of FIG. 7, the outer surfaces of the limbs face away from the stem so that the bristles 42 are oriented substantially radially of the longitudinal axis of the stem 40; i.e., they radiate outwardly from all sides of the applicator 46 around the periphery thereof so as to form a complete brush.

The bristle-free outer end portions 44 of the folded limbs cooperatively constitute a shank portion 50 of the assembled brush, overlying and surrounding the lower free end of the stem. This shank is inserted into the open distal end 52 of a hollow shaft 54 that is mounted, at its proximal end, in the cap 56 of a mascara container (not shown). Shaft 54 serves as a retainer, holding the outer end portions 44 of the folded limbs together in the assembled condition in which the limbs of the panel (and their outwardly radiating bristles) surround the stem axis. The relationship between the cap 56 and the applicator 46 is essentially the same as that between the cap of a mascara container and a conventional mascara brush; when the cap is threaded on the container neck, the applicator 46 extends into the container interior, and when the cap is removed from the neck it is manipulated by the user as a handle for applying mascara to the user's lashes with the brush.

As used herein, the terms "distal" and "proximal" refer respectively to the brush end and handle/cap end of an applicator of the mascara brush type.

Advantageously, to provide structural stability to the assembled applicator, the limbs of the panel as well as the stems are made relatively rigid, by appropriate selection of the plastic material employed and the dimensions chosen for the limbs and stem, while the hinge portions are made sufficiently thin to enable bending of the limbs through 90° at the hinges.

It may also be desired to form the bristles of a plastic material different from and softer than that of a panel and stem. To this end, as shown in FIG. 8, the limbs 34A of a panel 30A may be formed in the initial panel-molding operation with elongated voids or slots 35 that occupy the same regions of the limbs as the bristles 42 in the panel 30 of FIG. 5 and open in directions parallel to each other and to the stem 40A, and substantially perpendicular to the mold plane in which the limbs initially lie. Thereafter, while the limbs still lie in a common mold plane, bristles 42A are formed in the slots 35 of all the limbs 34A by an insert molding procedure, for example as inserts 43 with one or more rows of plastic bristles 42A (FIGS. 9 and 11, 11A, 11B and 11C) or as inserts 45 bearing tufts of fibers 47 (FIGS. 10 and 12) similar to the fibers of a conventional mascara brush. The as-molded bristles 42A project substantially in a common direction (the pull direction, as defined above) while the limbs continue to lie in the mold plane. After molding is complete, assembly of the applicator proceeds in the manner illustrated in FIGS. 6 and 7.

As generally mentioned above, and as indicated in FIGS. 8-12, the bristles 42a firmed on a limb may depart from strict parallelism with each other and with the pull direction. Thus, when the bristles are arranged in two parallel rows along a limb, bristles of one of the rows may diverge from bristles of the other row, with each bristle being oriented at an angle of e.g. 23° to the common pull direction. Such diverging bristles are within the meaning of the term "oriented substantially in a common pull direction" provided that they are sufficiently close to parallelism to enable the molded limb to be easily separated from its mold by relative movement of mold and limb in the common pull direction.

A second embodiment of the applicator of the invention is illustrated in FIGS. 13-17. The applicator includes an integral molded outer plastic panel 60 of generally rectangular configuration as seen in plan view when it is lying substantially in the mold plane (the plane of FIG. 13), constituted of a plurality of relatively rigid portions 62 interconnected by relatively flexible hinge portions 64, the relatively rigid portions being parallel to each other when the panel is lying in the mold plane, and the hinge portions being disposed between and parallel to the relatively rigid portions for bendably interconnecting adjacent ones of the latter portions. The portions 62, as illustrated, may be formed as ribs of outwardly convex cross-section.

Each of the relatively rigid portions 62 is molded with an array of holes 66 (shown, for example, as a longitudinal row of holes) opening therethrough in substantially parallel directions (i.e., in the above-defined pull direction) perpendicular to the mold plane when the panel 60 is lying in the mold plane. Thus, the panel can be produced in a generally conventional injection mold and easily separated therefrom. Each relatively rigid portion 62 has a proximal end 68 and a distal end 70; the rows of holes 66 extend from the distal ends of the portions 62 for a major portion of the length thereof but terminate somewhat short of the proximal ends of the portions 62 so that each portion 62 has a hole-free proximal region 72.

The applicator of FIGS. 13-17 also includes a second integral molded plastic panel 74, again lying substantially in a mold plane when formed and being of rectangular configuration as seen in plan view in that condition. The panel 74 has an outer surface on which are integrally molded rows of projections or bristles 76, generally perpendicular to the last-mentioned mold plane (i.e., oriented substantially parallel to a common pull direction) when the panel 74 is lying in the mold plane, enabling the panel 74 to be molded in a generally conventional injection mold and easily pulled from the mold. The bristles 76 are respectively positioned for register with the holes 66 of the outer panel. The inner panel, in this embodiment, is formed of a material softer than that of the outer panel 60, and the bristles 76 are therefore softer and more flexible than they would be if they were simply molded integrally with the outer panel.

Figure 13:
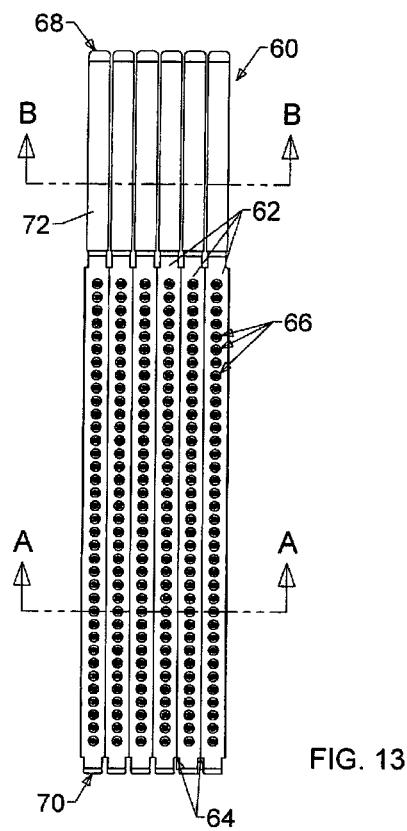
FIG. 13 is a plan view of the outer panel of another embodiment of the invention, shown as lying in a mold plane.
Figure 14:
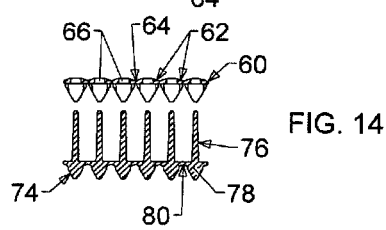
FIG. 14 is an exploded cross-sectional view, taken as along line A-A of FIG. 13, of the outer and inner panels of the applicator of FIG. 13, both shown as lying in mold planes.
Figure 15:
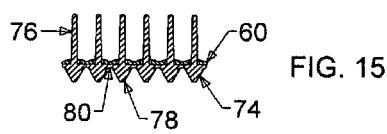
FIG. 15 is a view similar to FIG. 14 showing the outer and inner panels in assembled relation but still lying in mold planes.

The inwardly facing surface of the outer panel 60 and the outwardly facing surface of the second or inner panel 74 are substantially flat when the panels are in the as-molded condition substantially lying in respective mold planes as represented in FIGS. 13-15, to facilitate superposing the outer panel on the second panel and insertion of the second-panel bristles 76 through the outer-panel holes 66 as shown in FIG. 15, in the first step of assembling the applicator. The inwardly facing surface of the second panel 74 is molded to provide a plurality of parallel ribs 78 of generally triangular cross-section, corresponding to the rigid portions 62 of panel 60 in number and orientation when the two panels are juxtaposed as shown in FIG. 15, with hinge portions 80 formed integrally with and connecting adjacent ribs 78.

Figure 16:
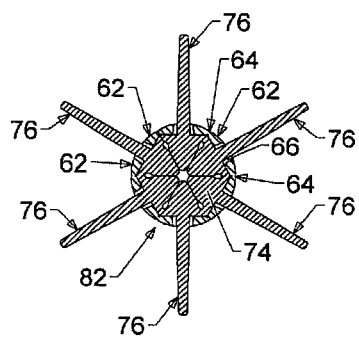

After the two panels have been initially brought together as shown in FIG. 15 with the flexible bristles 76 of the inner panel 74 extending outwardly through and beyond the holes 66 of the outer panel 60, the two panels are curved or bent together about an extended longitudinal axis parallel to rib portions 62 so as to surround the axis and thereby to be transformed from the generally planar assembly of FIG. 15 to a generally cylindrical applicator 82, shown in FIG. 16, in which the ribs 62 of the outer panel 60, connected by hinges 64, constitute a shell or exoskeleton of sufficient rigidity to sustain the shape of the applicator, surrounding a relatively soft inner core constituted of the inner panel 74 bent into a cylinder and filling the interior of the shell. The bristles 76, oriented substantially parallel to each other when the panels lie substantially in their mold planes, radiate outwardly from the applicator around the periphery thereof, projecting through the correspondingly oriented holes 66 to form a generally cylindrical brush bristle array.

As in the description of other embodiments of the invention, the term "relatively rigid portions" refers to portions of a molded plastic panel having sufficient rigidity to maintain the applicator as a self-sustaining structure when the panel is transformed from an initially generally planar condition to a final, e.g. substantially cylindrical, condition in which the relatively rigid portions surround an extended longitudinal axis. The hinge portions interconnecting the relatively rigid portions are made sufficiently flexible to enable the panel to be bent into the generally cylindrical configuration of the final applicator even though the relatively rigid portions are not themselves bendable.

Figure 17:
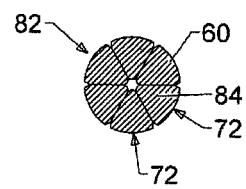
FIGS. 16 and 17 are cross-sectional views, respectively taken as along lines A-A and B-B of FIG. 13, of the applicator of FIG. 13 bent to surround an extended longitudinal axis.

FIG. 16 is a cross-section of the assembled applicator 82 taken as along the line A-A of FIG. 13, through the portion of outer panel 60 in which the relatively rigid portions 62 have holes 66. FIG. 17 is a similar cross-section of applicator 82 taken as along the line B-B of FIG. 13, through the hole-free proximal regions 72 of portions 62. The inner panel 74 does not extend proximally to these regions; instead, the latter regions of the relatively rigid portions 62 of the outer panel are formed with generally triangular inwardly directed ribs 84. In the transformed condition of FIG. 17, the regions 72 (which are free of outward projections or bristles, as well as being free of holes) cooperatively constitute the shank of the applicator wherein the ribs 84 serve as a core. As shown, the outer diameter of the shank can be smaller than that of the bristle-forming portion of the applicator when bent into a cylinder, and the proximal regions 72 of portions 62 can be spaced apart rather than connected by hinges 64.

The shank is inserted in a sleeve or hollow shaft of an applicator handle (not shown in FIGS. 13-17) which may be generally similar in structure and functions to that illustrated in FIG. 7 and described above, retaining the panel 60 in the cylindrical configuration of FIGS. 16-17. Additional retainer structures (also not shown) may be provided to retain the distal end of panel 60 in the cylindrical shape.

Figure 18:
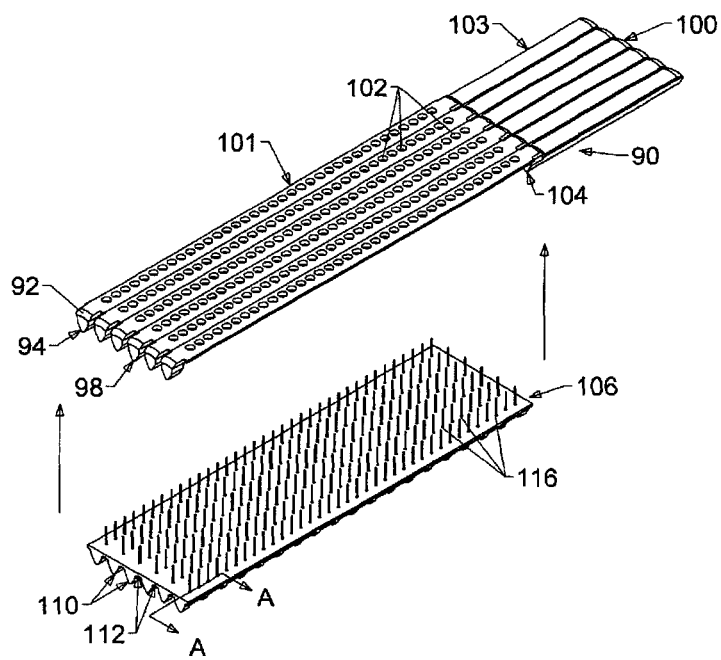
FIG. 18 is an exploded perspective view of outer and inner panels of a further embodiment of the applicator of the invention, both lying in mold planes.
Figures 19, 20:
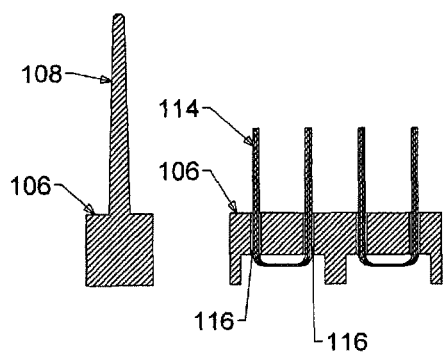
FIGS. 19 and 20 are enlarged fragmentary elevational sectional views, respectively, of portions of the inner panels of the embodiments of FIGS. 13 and 18, illustrating the difference between types of projections used in these two embodiments.
Figure 21:
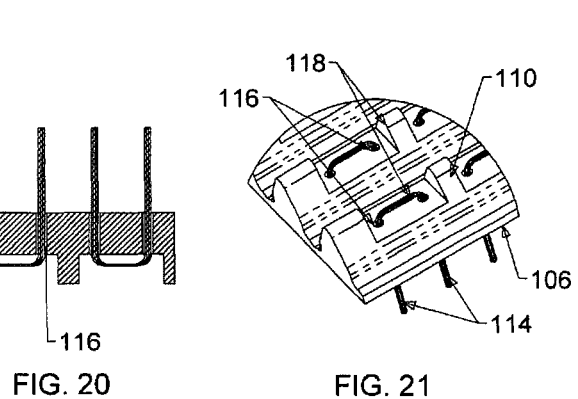
FIG. 21 is a fragmentary perspective view of a portion of the inner panel of FIG. 18, taken as along line A-A of FIG. 18.

In the embodiment of FIGS. 18 and 20-21, an initially generally rectangular integrally molded plastic outer panel 90 has a plurality of parallel rib portions 92 of outwardly convex cross section interconnected by generally parallel and relatively flexible hinge portions 94 between the rib portions. The panel 90 has a distal end 98 and a proximal end 100; in a first region 101 of the panel, extending from the distal end for more than half the length thereof, rows of holes 102 are formed in the ribs, but there are no holes in the remaining region 103 of the panel adjacent the proximal end 100. The inwardly facing surface of panel 90 is substantially flat in region 101, while in region 103 the inwardly facing surface of the panel is formed with ribs 104 of generally triangular cross-section.

The embodiment of FIGS. 18 and 20-21 also includes an initially generally rectangular integrally molded plastic inner panel 106 having an initially flat outer surface bearing an array of outwardly projecting bristles 108 respectively positioned for register with, and insertion in, the holes 102 of the outer panel when the outer panel is superposed on the inner panel in the first step of assembly, shown in FIG. 18. The inwardly facing surface of panel 106 is formed with plural parallel longitudinal ribs 110 of generally triangular cross-section interconnected by parallel hinge portions 112.

Each of panels 90 and 106, as molded, lies substantially in a mold plane, while the holes 102 of panel 90 open in a common direction (pull direction) perpendicular to the mold plane of panel 90, and the projections (bristles) 108 of panel 106 project in a common direction perpendicular to the mold plane of panel 106, enabling the panels to be molded in generally conventional injection molds and to be easily separable from the molds.

The proximal-to-distal length of inner panel 106 is equal to the corresponding dimension of region 101 of outer panel 90. In a first assembly step, panel 106 is placed in register with the region 101 of panel 90 as shown in FIG. 18, the flat inner surface of region 101 facing the flat outer surface of panel 106 and the bristles 108 being disposed for insertion into the holes 102; the two panels are then brought together so that the bristles project through and outwardly beyond the holes. Thereafter, the two panels are bent or curved together about an extended longitudinal axis parallel to the ribs 92, transforming the initially generally planar panel array with its parallel holes and bristles into a generally cylindrical applicator, having the last-mentioned axis as its geometrical axis, wherein the bristles radiate outwardly at locations distributed around the periphery of the cylinder. The region 103 of panel 90 constitutes the shank of the applicator and (as in the case of the applicator of FIGS. 13-17) may be received in a shaft or sleeve of an applicator handle or mascara container cap (not shown in FIGS. 18-21) to retain the panels in the cylindrical configuration. Again, the outer diameter of the shank can be less than that of the bristle-bearing portion of the applicator when bent into a cylinder, and the proximal, shank-forming regions of the ribs can be spaced apart rather than hinged together.

Unlike the bristles 76 of the embodiment of FIG. 13, which are molded integrally with panel 74 (as illustrated, for purposes of comparison, in FIG. 19), the bristles 108 in the embodiment of FIG. 18 are tufts of brush fibers 114 (FIG. 20) inserted through adjacent holes 116 formed in panel 106. FIG. 21, a fragmentary view of a portion of the inner surface of panel 106, illustrates the provision of these holes 116 in recessed portions 118 of the inner panel ribs 110. The provision of such tufts in applicators of the invention will be further described below.

The integral, unitary molded plastic panel of the applicator of the invention may alternatively be made sufficiently flexible throughout so as to be bendable into a cylinder with substantially continuous uniform surface curvature. Such an applicator is shown in FIGS. 22-25, wherein the panel 120 is a soft, flexible and generally rectangular element having a multiplicity of soft bristles 122 formed on its outer surface and, in the as-molded condition, oriented in a common pull direction perpendicular to the mold plane in which the panel initially lies (FIGS. 23 and 24). The proximal-to-distal side edges 124 and 126 of the panel are formed as longitudinally extending L-shaped flanges 128 and 130 initially opening toward each other across the inner surface of the panel.

To assemble the applicator of FIGS. 22-25, the panel is rolled or bent about a longitudinal axis to form a cylinder 127 (FIGS. 22 and 25) with the bristles projecting radially outwardly at locations distributed around the cylinder periphery and the flanges 128 and 130 abutting each other to form a longitudinal T-shaped ridge 132 enclosed within the cylinder.

A rigid, generally cylindrical molded plastic core 134, having a slot 136 of T-shaped cross-section opening through and extending longitudinally from its distal end 138, is dimensioned to be inserted lengthwise into the cylinder 127 and to receive ridge 132 within slot 136, thereby to serve as an internal support for the applicator and as a retainer holding the panel in the cylindrical configuration. The slot 136 terminates some distance from the proximal end of the core 134, providing a shank portion 140 of the core for mounting in the shaft or sleeve of an applicator handle/mascara container cap (not shown).

A modified structure of this type is shown in FIGS. 26-29, wherein the molded, soft, flexible plastic panel 142, rectangular in plan, has the cross-sectional shape of a right-angled Z (FIG. 27). The upper and lower limbs of the Z, as molded, are flat portions respectively designated 144 and 146, lying in parallel horizontal planes and connected by a vertical central septum 148 (the terms "vertical" and "horizontal" being used merely for convenience to designate relative orientations). A first array of soft molded plastic bristles 150 is formed on and projects vertically upwardly from the upper surface of panel portion 144, while a second array of soft molded plastic bristles 152 is formed on and projects vertically downwardly from the lower surface of panel portion 146. In addition, a first flat vertical longitudinal flange 154 projects downwardly from the outer side edge of panel portion 144 and a second flat vertical longitudinal flange 156 projects upwardly from the outer side edge of panel portion 146.

Considering the "mold plane" of this panel as the two parallel planes of panel portions 144 and 146, and the "pull direction" as the direction perpendicular to those planes, it will be seen that in the as-molded condition of FIG. 27, both panel portions 144 and 146 lie substantially in the mold plane, while all other features of the panel (septum 148, bristles 150 and 152, and flanges 154 and 156) are oriented in the pull direction. Hence, like the panels of the other embodiments of the invention herein described, the panel 127 may be readily produced in a generally conventional injection mold and easily separated therefrom.

To assemble an applicator using panel 127, the two panel portions 144 and 146 are bent or rolled through 180° in opposite directions about an extended longitudinal axis (coincident, in this case, with the geometric long axis of septum 148) such that the bristles 150, 152 project outwardly and the flanges 154 and 156, both inverted from their initial orientations, respectively lie flush against opposite sides of the septum 148. The panel is thereby transformed into a cylinder 158 with outwardly radiating bristles distributed around its periphery and a central internal longitudinal wall 160.

A rigid plastic core 162, having a cylindrical shank portion 164 at its proximal end and a pair of parallel prongs 166 projecting distally therefrom, serves as an internal support for the cylinder 158. The two prongs of the core, inserted longitudinally into the proximal end of the cylinder through the openings between the cylinder and wall 160, project beyond the distal end of the cylinder; the outer surfaces of the distal ends of the prongs, as indicated at 168, are shaped with an annular groove and taper to constitute a snap-fit seat for a plastic cap 170 having an internal annular ridge 172 engageable with groove 168. After the core prongs have been inserted entirely through the cylinder 158, the cap 170 is snap-fitted on the prong ends, cooperating therewith to retain the panel 142 in the cylindrical shape by holding the prongs in gripping relation to the wall 160 and thereby securing the flanges 154 and 156 against the septum 148.

Figures 30, 31:
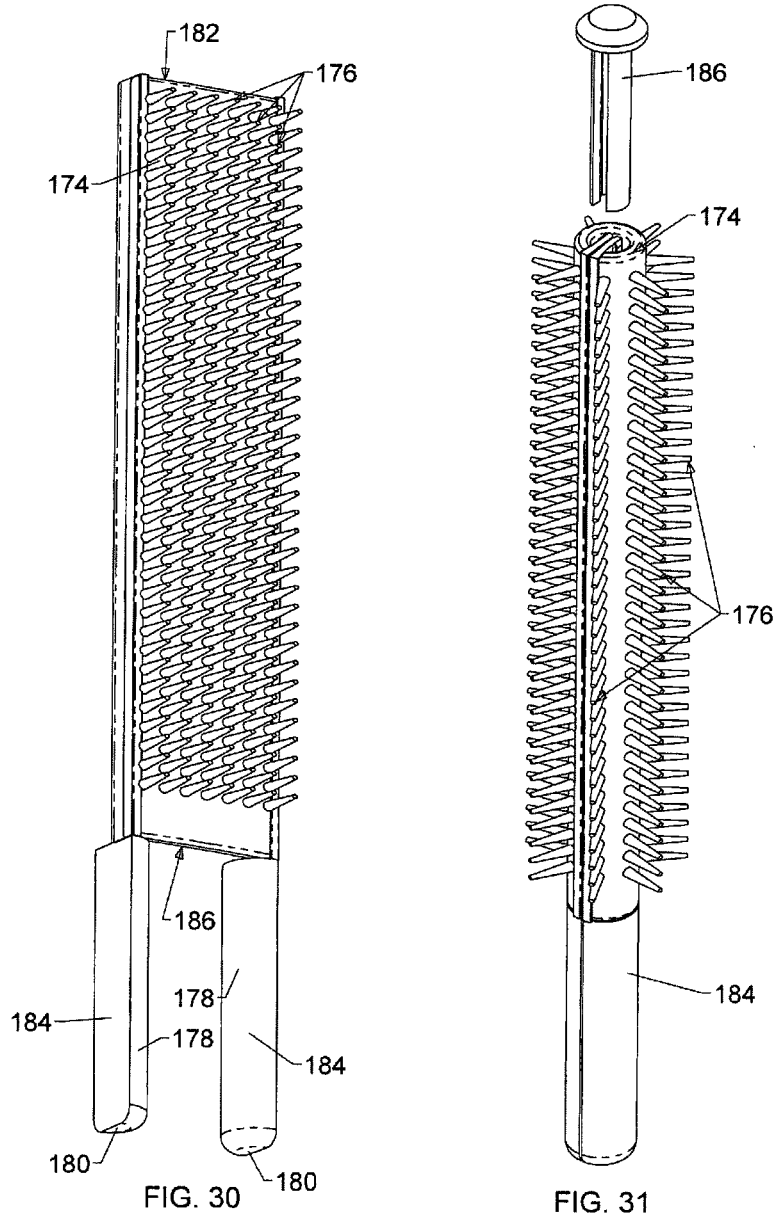
FIG. 30 is a perspective view of the panel of another embodiment of the invention, lying in a mold plane.
FIG. 31 is an exploded perspective view of the applicator of FIG. 30 with the panel bent to surround an extended longitudinal axis.

FIGS. 30 and 31 illustrate another modified embodiment of the invention, in which an integral molded plastic panel 174 made of soft flexible material and rectangular in shape as molded (i.e., when lying substantially in a mold plane), bearing on its outer surface a multiplicity of molded plastic bristles 176 oriented in a common pull direction perpendicular to the mold plane, is provided with a pair of longitudinal stiffeners 178 respectively secured to and extending along its opposite side edges, in opposed relation to the bristle-bearing surface of the panel. These stiffeners are molded of relatively rigid plastic and are generally hemispherical in cross-section, with flat surfaces 180 facing laterally outward (FIG. 30) in the as-molded condition of the panel. The stiffeners may be insert molded on the panel or secured thereto by assembly. Each of the stiffeners extends to the distal end 182 of the panel, and also includes a shank portion 184 projecting beyond the proximal end 186 of the panel.

To assemble the applicator, the panel 174 is bent or rolled about an extended longitudinal axis parallel to the stiffeners 178 until the flat surfaces of the stiffeners abut each other, at which point the panel is cylindrical in configuration and the bristles 176 radiate outwardly therefrom and are distributed around the periphery of the cylinder (FIG. 31). The shank portions 184 cooperatively constitute a shank which is inserted in a shaft or sleeve of an applicator handle (not shown) to hold the proximal ends of the stiffeners together, while a clip 186 of stiff plastic is inserted into the distal end of the applicator to hold the distal ends of the cylinder together, such that the panel is held in cylindrical shape.

A still further configuration for the integral molded plastic panel of the invention is as a narrow, elongated flexible band of soft material that, as molded, lies substantially in a mold plane with a surface bearing molded projections or bristles extending therefrom substantially in a common pull direction transverse to the plane. In assembly, the band is wound helically about an extended longitudinal axis with the projection-bearing surface facing outwardly to form a conical, frustoconical, or cylindrical applicator.

Figures 32, 33:
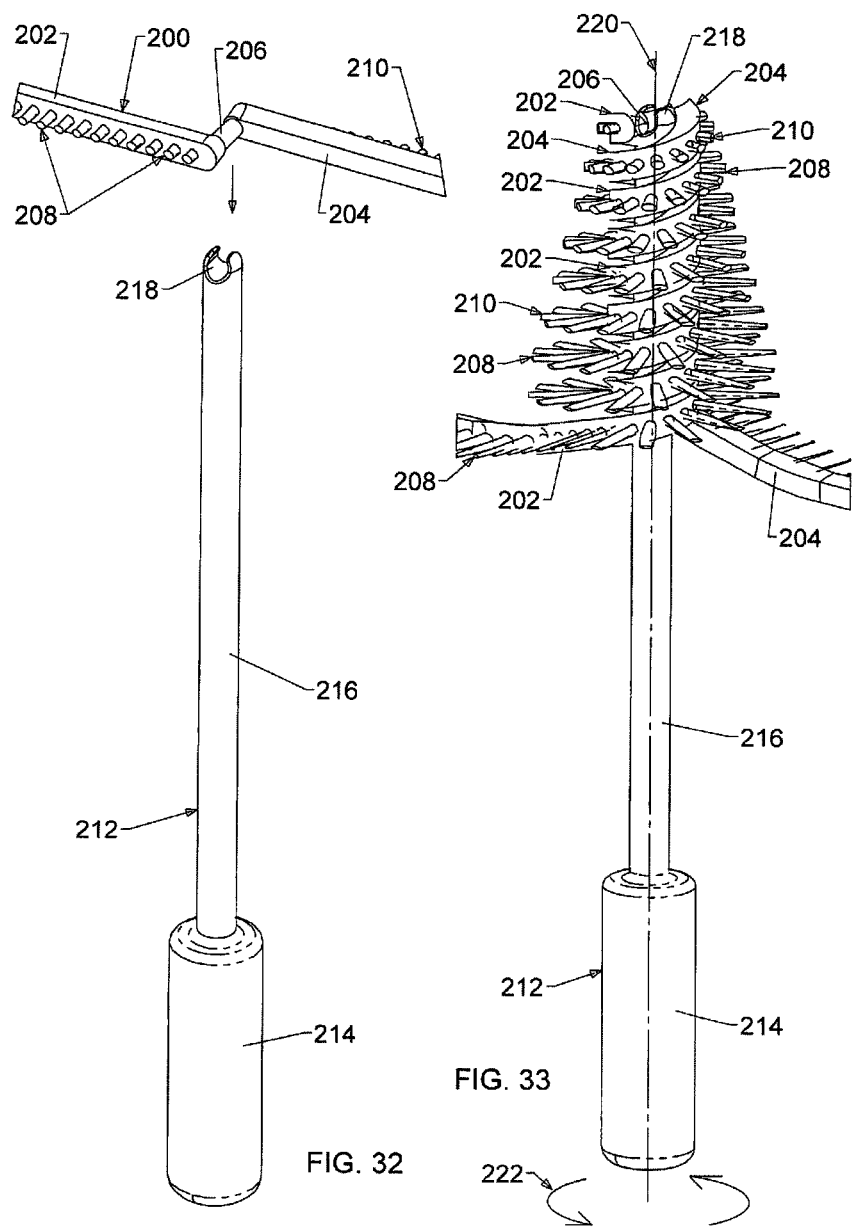
FIG. 32 is an exploded perspective view of a further embodiment of the invention, before the panel is bent.
FIG. 33 is a view similar to FIG. 32 but showing the panel being bent.

One specific embodiment including such a band of soft, flexible material is shown in FIGS. 32 and 33. The band 200 in this embodiment includes two portions, respectively designated 202 and 204, which as molded extend substantially in parallel but offset planes (mold plane) and are disposed substantially end to end with their adjacent ends connected by a post 206 extending perpendicular to the parallel planes. The portion 202 has a multiplicity of bristles 208 formed on a surface thereof facing away from portion 204, and portion 204 has a multiplicity of bristles 210 formed on a surface thereof facing away from portion 202; the bristles 208 and 210, as well as the post 206, are oriented substantially in a common pull direction perpendicular to the parallel planes with the bristles on the two band portions respectively pointing in opposite directions when the panel is in as-molded condition of FIG. 32.

A generally cylindrical core 212 of rigid molded plastic, including a proximal portion or shank 214 and an extended distal portion 216, serves as a structural support for the applicator made from the band 200. The distal end of portion 216 is formed as a clip 218 for receiving and gripping the post 206 at the midpoint of band 200. With the post inserted in and held by the clip, the core is twisted about its long axis 220 as indicated at 222 in FIG. 33 so as to cause the two portions of band 200 to wind helically around core portion 216, thereby transforming the initially planar band into an applicator wherein the band is bent to surround the extended longitudinal core axis 220 in a generally cylindrical configuration, with turns of the two band portions 202 and 204 alternating and with the bristles on both band portions radiating outwardly from the core axis 220. The shank portion 214 of the core may be mounted in an applicator handle, e.g. of the general type shown in FIG. 7, described above, with the outer ends of the two band portions 202 and 204 suitably anchored.

FIGS. 34-36 illustrate a modified embodiment of the invention in which the panel is again a band 224 of soft, flexible plastic material, lying substantially in a mold plane in as-molded condition and bearing on one surface a multiplicity of soft, flexible plastic bristles 226 molded integrally with the band. The bristles 226, in the as-molded condition of the band, are oriented substantially in a pull direction transverse (perpendicular) to the mold plane (FIG. 35). The band 224 differs from the band 200 of FIGS. 32-33, however, in being a single continuous band portion adapted to be secured at one end 228 to the distal extremity of a core and to be wound helically as a single strand around the core.

This embodiment may utilize the core 212 described above with reference to FIGS. 32 and 33, with the clip 218 modified to grip and retain the end 228 of the band 224. As shown in FIGS. 35 and 36, with the band end inserted in and held by the clip, the core is twisted about its long axis 220 so as to cause the band 224 to wind helically around core portion 216, transforming the initially planar band into an applicator wherein the band is bent to surround the extended longitudinal core axis 220 in a generally cylindrical configuration, with the bristles 226 radiating outwardly from the core axis 220. The shank portion 214 of the core may be mounted in an applicator handle (not shown) as described above, with the outer end of the band 224 suitably anchored.

Alternatively, as shown in FIG. 37, the band-supporting core may be a metal wire 230 secured at its distal end to the end 228 of the band. The band is then helically wound around the core wire to constitute an applicator with outwardly radiating bristles 226, and the wire is mounted in an applicator handle (not shown).

A wide variety of arrangements of bristles on the surface of the band 200 or 224 may be employed, instead of the single row of bristles of FIGS. 32-37. Two non-limiting examples are illustrated in FIG. 38 and FIG. 39, which respectively show plural rows of bristles 208a, 208b and 208c of differing heights on a band portion 202, and a double row of staggered bristles 226a on band 224.

Yet another embodiment of the applicator of the invention in which the panel is a narrow bristle-bearing band is shown in FIGS. 40-48. The band 232 in this embodiment is molded around a reinforcing wire 234 of metal (FIG. 43) which extends longitudinally within, and is entirely laterally surrounded by, the band. A multiplicity of bristles 236, integrally molded with the band, are disposed along the length of the band, projecting from one surface thereof. The band may be made of a soft, flexible plastic material, using a generally conventional injection mold in which the wire 234 is positioned before the plastic material is introduced; in the as-molded condition, the band 232 lies substantially in a mold plane and the bristles 236 are oriented substantially in a common pull direction transverse (perpendicular) thereto.

To transform the wire-reinforced band into an applicator, the band is initially held at its midpoint 238 (FIGS. 40 and 41), which becomes the tip of the applicator, and the two legs 240 and 242 of the band are then twisted around each other in the same way that the legs of the wire core of a conventional twisted-in-wire mascara brush are twisted, so that the band is bent to surround the extended longitudinal axis of twisting with the bristles radiating outwardly from that axis. The reinforcing wire 234 within the band is selected to be stiff enough to hold the twisted shape. The proximal ends of the legs, twisted together, may then be mounted in an applicator handle (not shown).

Steps in the manufacture of a specific exemplary mascara brush of the embodiment of FIGS. 40-43 are illustrated schematically (not all to the same scale) in FIGS. 44-48.

FIG. 44 shows the as-molded band 232, lying substantially in a mold plane, with the wire 234 extending longitudinally therethrough and bristles projecting from the band substantially in a common pull direction transverse to the mold plane. In this example, the band is molded in two tandem portions 232a and 232b spaced apart at the midpoint 238 of the wire. Portion 232a bears a set of uniform long molded bristles 236a substantially perpendicular to the mold plane, while portion 232b bears two rows of uniform shorter molded bristles 236b inclined at small angles to the perpendicular and to each other, thereby forming a v. Although the bristles 232b are thus inclined to the pull direction, they are nevertheless substantially oriented in the pull direction because the angle of inclination is sufficiently small so as not to interfere with separation of the mold plates and removal of the molded panel (band) from the mold.

FIG. 45 is a complete side view, at a reduced scale, of the band and wire of FIG. 44, still in the as-molded condition.

It will be noted that the band portions 232a and 232b terminate short of the proximal ends 244 of the wire.

The wire 234 is bent at its midpoint 238 through 180° as shown in FIG. 46, so that the two legs 240 and 242, respectively having band portions 232a and 232b, extend parallel to each other with the bristles 236a and 236b projecting in opposite directions. Thereafter, as illustrated in FIG. 47, the wire is twisted about a longitudinal axis into an increasingly tight helix, and the bristles are correspondingly distributed in a helical pattern, wherein alternate turns are constituted of bristles 236a and bristles 236b.

Figure 48A:
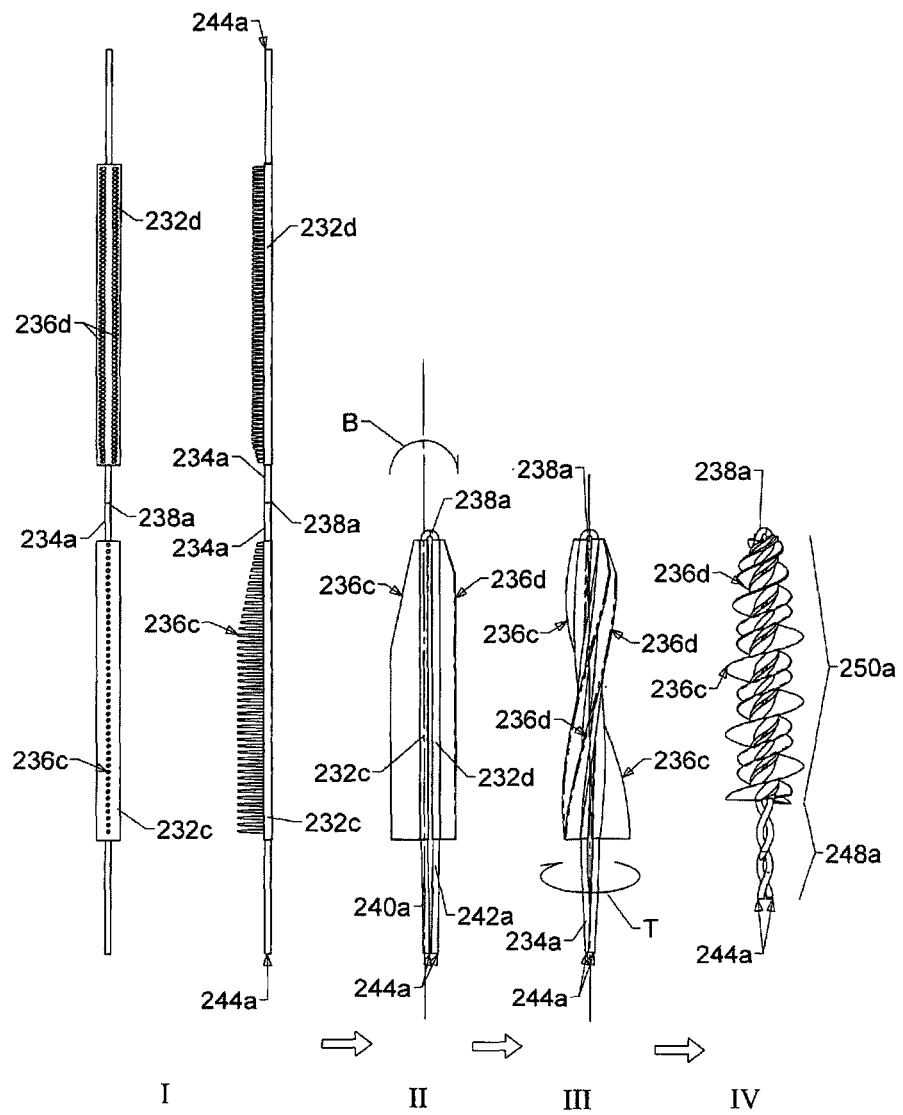
FIG. 48A is a flow chart of the process of forming an applicator of the type of FIG. 48 from an as-molded panel of the type of FIG. 45.

The final applicator 246, shown in FIG. 48, includes a proximal twisted wire shank portion 248 mountable in an applicator handle (not shown) and a brush portion 250 wherein the bristles 236a and 236b, in alternating helical patterns, radiate outwardly. FIG. 48A is a flow chart of the process of transforming an as-molded panel (I) of the type of FIG. 45 through successive stages of bending (II) and twisting (III) until a final applicator (IV) is achieved, with the direction of bending indicated by arrow B and the direction of twisting indicated by arrow T. In FIG. 48A, band portions 232c and 232d with bristles 236c and 236d correspond to band portions 232a and 232b with bristles 236a and 236b in FIG. 45; wire 234a with midpoint 238a, legs 240a and 242a, and ends 244a corresponds to wire 234 with midpoint 238, legs 240 and 242 and ends 244 in FIG. 45; and shank and brush portions 248a and 250a correspond to portions 248 and 250 in FIG. 45, with some dimensional alterations.

Figures 49, 50, 51:
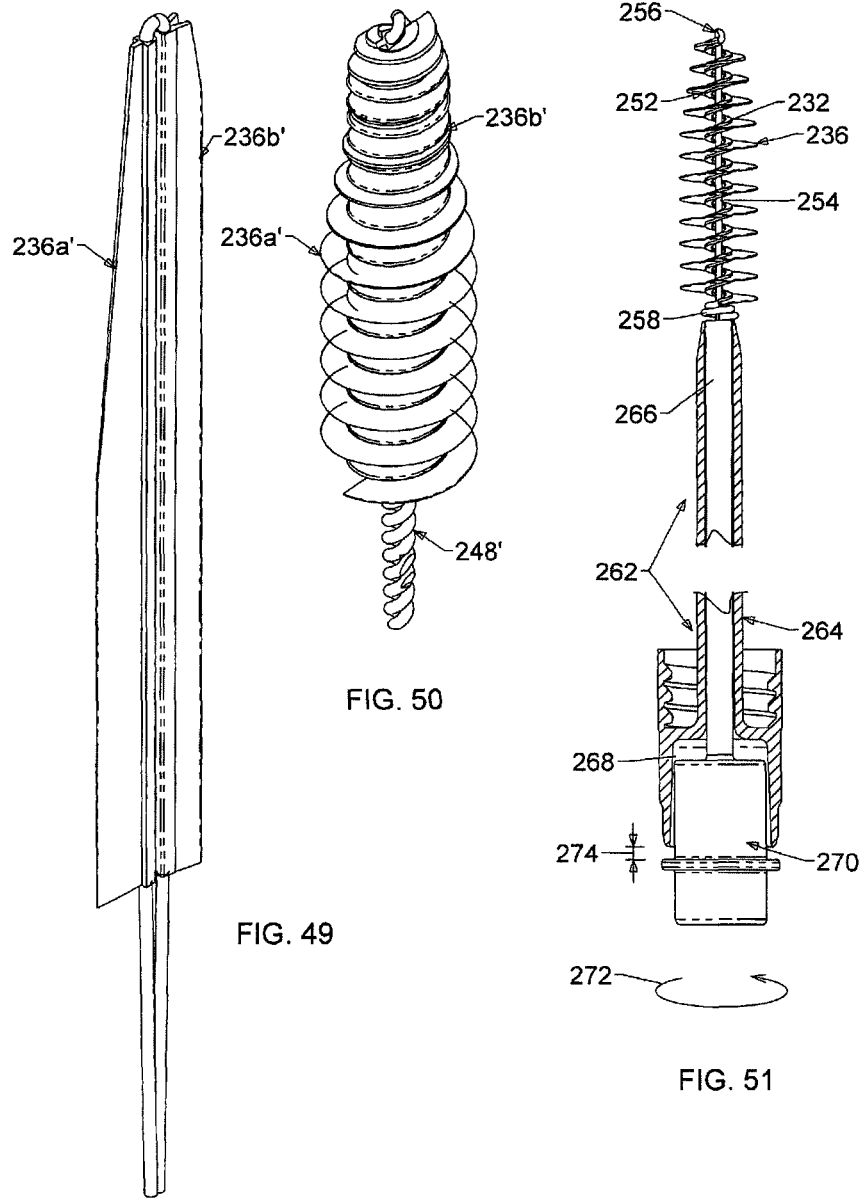
FIGS. 49 and 50 are schematic side views, respectively corresponding to FIGS. 46 and 48, illustrating successive stages in bending a modified form of the applicator.
FIG. 51 is a schematic side sectional view of a further embodiment of the invention, incorporating a panel of the general type shown in FIG. 40.

A modification of this applicator is illustrated, in successive stages of bending, in FIGS. 49 and 50, which respectively correspond to the bending stages represented in FIGS. 46 and 48. In the modified applicator, the bristles 236a' are not of uniform length, but become progressively shorter from about the midpoint of the bristle array to the distal end of the brush, and the bristles 236b' are also not of uniform length but become first progressively shorter, then progressively longer, and finally progressively shorter again, proceeding toward the distal end of the brush. As a result, when the wire shank portion 248' is fully twisted, the bristle tip envelope or profile is as shown in FIG. 50. The bristles may be molded with these differing lengths, or they may be molded with uniform lengths as shown in FIG. 44 and then trimmed or cut before or after the band is bent.

Figure 40:
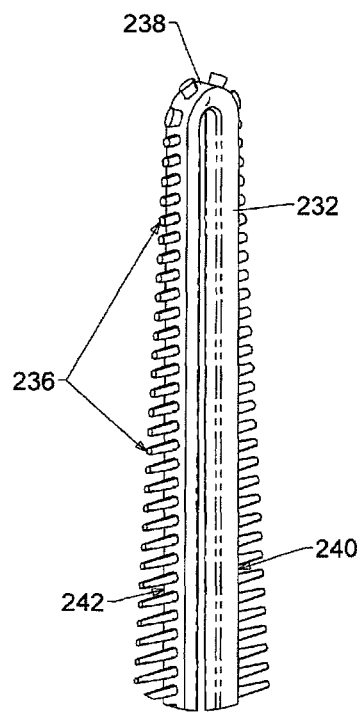
FIG. 40 is a fragmentary perspective view of the panel of a further modified form of the applicator of FIG. 32, at a first step in bending of the panel.
Figure 41:
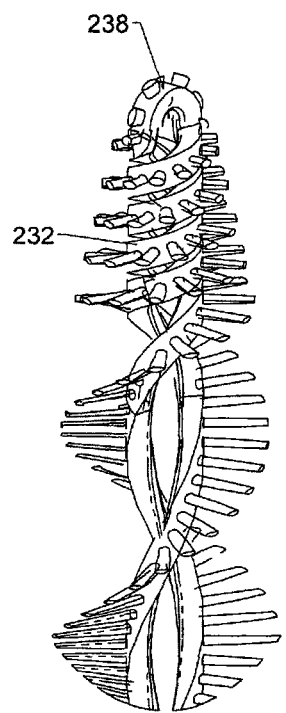
FIG. 41 is a view similar to FIG. 40 showing an intermediate stage in bending of the panel.
Figure 42:
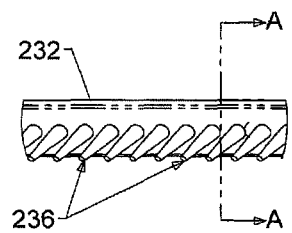
FIG. 42 is a fragmentary perspective view of a portion of the panel of FIG. 40.
Figure 43:
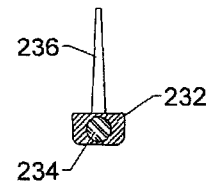
FIG. 43 is a cross-sectional view of the same panel, taken along line A-A of FIG. 42.

Another applicator embodying the invention and employing a band 232 as shown in FIG. 40 is illustrated in FIG. 51. In this embodiment, the wire-containing band is wound in a single resilient, springlike helix 252, with its bristles 236 (not individually shown in FIG. 51) projecting radially outwardly with respect to the axis of the helix; a metal shank 254, secured at its distal end to the distal end 256 of the helix 252, extends coaxially through the helix to the proximal end 258 of the helix. The applicator of FIG. 51 also includes an actuator 262 having a rigid, hollow, open-ended outer stem 264 and a rigid inner stem 266 extending entirely through the hollow outer stem, coaxially therewith, so as to be movable, relative to the outer stem, linearly along and rotatably about their common axis, which is coincident with the axis of the helix. The proximal end 258 of the helix is fixedly mounted on the distal end of the outer stem, while the shank 254 is attached at its proximal end to the distal end of the inner stem. Secured to or formed integrally with the proximal end of the outer stem is an enlarged well 268 into which the inner stem 266 projects; an enlarged head 270 secured to the proximal end of the inner stem is received within the well, and is manually translatable along and rotatable about the common axis of the inner and outer stems, relative to the well.

In this device, manual rotation (arrow 272) of the head 270 relative to the well is imparted to the distal end of the helix 252 through the inner stem and shank, and since the proximal end of the helix is anchored to the outer stem, such rotation varies the pitch and outer diameter of the helix. Manual movement (arrow 274) of the head back and forth relative to the well along the stem axis, acting on the distal end of the helix through the inner stem and shank, causes the helix to contract or lengthen axially, varying the pitch between helical turns of the bristle array.

Various further modifications of the applicator of FIGS. 34-36 are illustrated in FIGS. 52-59F. The applicator in each of these modified embodiments includes a rigid plastic core (corresponding to core 212 of FIG. 34, and having a shank portion and a distal portion respectively corresponding to portions 214 and 216 of core 212, in position and function) formed at its distal end with a clip (corresponding to clip 218 of FIG. 34), and a band of soft, flexible plastic material (corresponding to band 224 of FIG. 34) lying substantially in a mold plane in as-molded condition and bearing on one surface a multiplicity of soft, flexible plastic bristles (corresponding to bristles 226 in FIG. 34) molded integrally with the band. These elements are so arranged that the clip grasps and secures the midpoint of the band (rather than on end of the band, as in FIG. 34) and the portions of the band on either side of the midpoint are wound radially around the distal portion of the core to constitute an applicator wherein the bristles extend radially outwardly with respect to the core.

Figures 52, 53, 54:
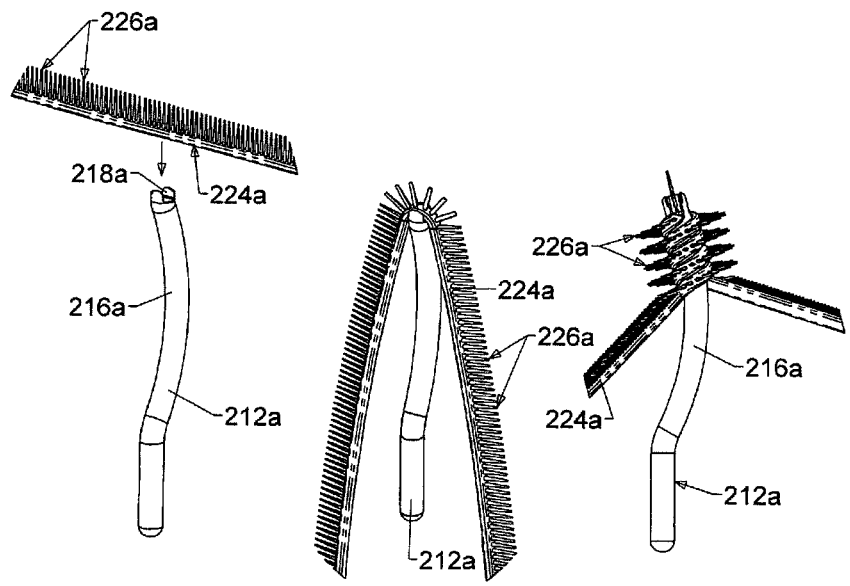
FIGS. 52, 53 and 54 are perspective views of a further modified form of the applicator of FIG. 32, illustrating successive stages in assembling the applicator.

In the applicator shown in FIGS. 52-54, the core 212a is formed with a curved distal portion 216a rather than an axially rectilinear distal portion as in FIG. 32. The clip 218a grips the midpoint of the band 224a (FIG. 53), which is otherwise similar to the band of FIG. 32, and the portions of the band 224a extending therefrom are wound helically around the distal portion 216a with the bristles 226a projecting outwardly therefrom (FIG. 54).

Figures 52A, 53A, 54A:
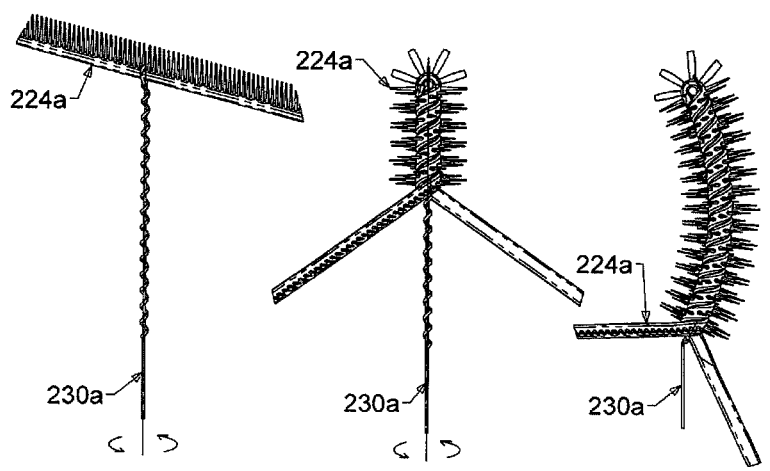
FIGS. 52A, 53A and 54A are schematic side views of successive stages in assembling a modified form of the applicator of FIG. 54.
Figure 55:
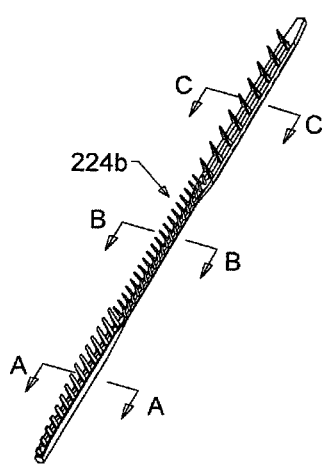
FIG. 55 is a perspective view illustrating an alternative band structure for the applicator of FIGS. 52-54.

As shown in FIGS. 52A, 53A and 54A, the core 212a may be replaced by a metal wire core 230a (like core 230 of FIG. 37) which is malleable, the term "malleable" being used herein to refer to a metal article which is capable of being bent and/or twisted and of holding a shape into which it is thus bent and/or twisted. The band 224a, secured at its midpoint to the distal end of core 230a (FIG. 52A), is wound helically around the core (FIG. 53A) in the same manner as in FIGS. 52-54, and the wire core is bent (FIG. 54A) into a desired shape, e.g. a curved shape corresponding to the curve of the core in FIGS. 52-54.

Figures 57A, 57B, 57C:
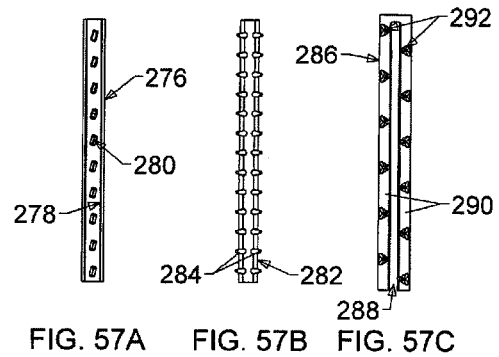
FIGS. 57A, 57B and 57C are fragmentary plan views of the portions of the band of FIG. 55 respectively shown in section in FIGS. 56A, 56B and 56C.
Figures 56A, 56B, 56C:
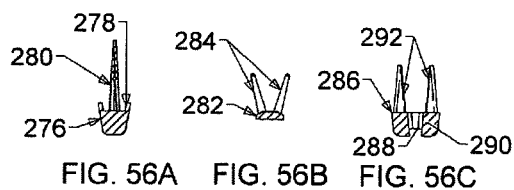
FIGS. 56A, 56B and 56C are sectional views respectively taken along lines A-A, B-B and C-C of FIG. 55.

FIGS. 55-57C show an alternative form of band 224b having successive portions with different profiles and/or bristle arrangements arranged in tandem along its length. In a first portion 276, shown in section in FIG. 56A and in plan view in FIG. 57A, the band itself is formed with an outwardly-facing channel 278 and a single row of bristles 280 of rectangular cross-section project outwardly therefrom. The second portion 282 of the band (FIGS. 56B and 57B) has an outwardly crowned profile bearing two longitudinal rows of bristles 284 of round or elliptical cross-section, with the bristles of one row diverging outwardly from the bristles of the other row. The third portion 286 of the band, illustrated in FIGS. 56C and 57C, is divided by a longitudinal slot 288 into two parallel legs 290 each bearing a single row of bristles 292 of triangular cross-section, the bristles on both legs extending parallel to each other.

These differing band portions are non-limiting examples of possible variations in bands of the general type shown at 224 in FIG. 34. They illustrate variations in band profile and width, and bristle shape; bristle distribution and size can also vary, to impart desired cosmetic-transporting and/or applying characteristics to the produced applicator. These and/or other differing configurations and bristle arrangements may be combined, as shown, in a single band for use in an applicator, or a band may be provided with any one of such configurations and arrangements along its entire length.

Figures 59A, 59B, 59C:
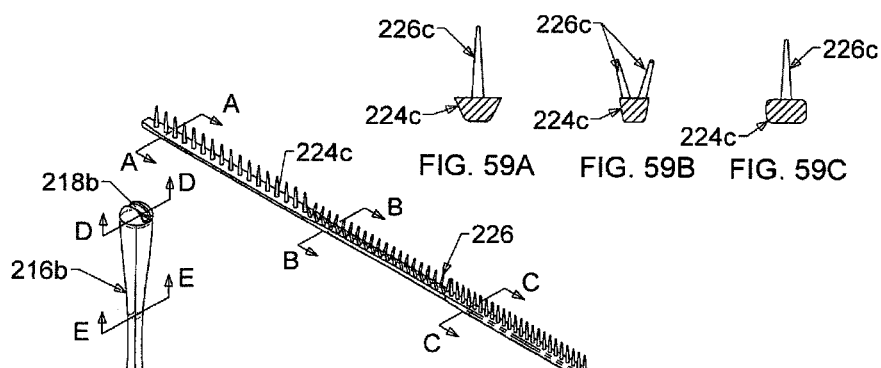
FIGS. 59A, 59B, 59C, 59D, 59E and 59F are sectional views respectively taken along lines A-A, B-B, C-C, D-D, E-E and F-F of FIG. 58.
Figure 58:
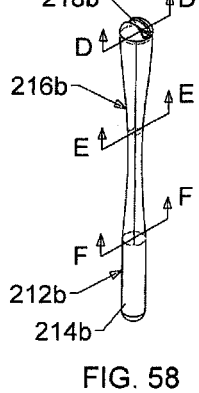
FIG. 58 is an exploded perspective schematic view illustrating a further modification of the applicator of FIG. 32.
Figures 59D, 59E, 59F:
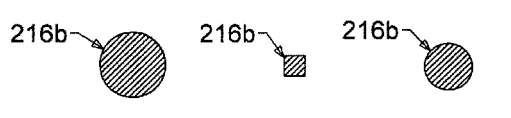

Similarly, as exemplified by the applicator shown in FIGS. 58-59F, the rigid core need not be of uniform, circular cross-section. The core 212b has a distal portion 216b with a first circular cross-section (FIG. 59D) near the clip 218b, a second, smaller circular cross-section (FIG. 59F) near the shank portion 214b, and an intermediate portion of small square cross-section (FIG. 59E). As one further alternative, the intermediate cross-section may be triangular (not shown) rather than square. Again, the illustrated variations of core profile are merely illustrative of possible variations, and the core distal portion may either vary from point to point along its length as shown, or may have a uniform noncircular cross-section throughout.

FIG. 59 additionally shows the varying-profile core 212b as associated with a band 224c that varies in width, profile shape and arrangement of bristles 226c along its length, in ways generally similar to the band 224b of FIGS. 55-57C. Such variations are illustrated in cross-section in FIGS. 59A, 59B and 59C. Alternatively, the core 212c could be used with a band, e.g. of the type shown at 224a in FIGS. 52-54, that is uniform throughout its length.

In the embodiments of the invention thus far described, wherein a plastic panel is molded with integral features such as openings or projections, the as-molded panel lies in a mold plane and the features are oriented substantially in a common pull direction perpendicular to the mold plane, thereby facilitating opening of the mold and separation of the molded panel therefrom, as explained above. Within the broader scope of the invention, however, it is possible to achieve the same advantages when the features, or some of the features, are projections oriented (i.e., extending from an edge of the panel) in the mold plane. In such case, the mold cavity defined by the facing mold plates includes portions, for forming the latter projections, defined by cooperating recesses in each of the mold plates, so that there is no interference between these projections and the mold plates as the mold plates separate.

One example of a molded plastic panel of this type, shown at 296 in FIGS. 60 and 61, is similar to the panel 232 of FIG. 40 in being molded around an elongated malleable metal insert 298. The plastic panel body 300 completely laterally surrounds the insert 298, and is illustrated as being rectangular in cross-section with first and second opposed panel surfaces 302, 304 and first and second opposed side edges 306, 308 between the surfaces. Features in the form of plastic projections 310, 314 respectively extend from the opposed panel surfaces in directions substantially perpendicular thereto, while additional plastic projections 316, 318 respectively extend from the opposed panel edges in directions perpendicular to the projections 310, 314.

The panel 296, which (like panel 232 of FIG. 40) has the shape of a narrow band, may be formed by molding between mold plates in the manner schematically illustrated in FIG. 1 and described above with reference thereto, the insert being placed in the mold cavity before the molding operation. The mold plane is indicated by line PL-PL in FIG. 61. As will be understood, recesses for forming the projections 310 and 314 are respectively provided in the upper and lower mold plates and extend substantially perpendicular to the mold plane, while the lateral projections 316 and 318, lying in the mold plane, are each defined by two cooperating recesses respectively provided in the two mold plate faces and extending in the mold plane. Thus, when the plates separate in the common pull direction D (FIG. 1), opening of the mold and removal of the molded panel 296 is not hindered by interference between any of the formed projections and the plates.

The panel 296, which is shown in FIG. 60 as bent into a U-shaped configuration, may be further bent and/or twisted so as to be transformed into cosmetic applicators having a variety of configurations. Examples of such applicators are illustrated in FIGS. 62-66.

In the applicator 320 of FIG. 62, the panel is bent into a U-shape similar to that of FIG. 60 but one leg of the U has multiple further bends 322 imparted thereto. The metal insert 298 has two exposed ends respectively extending beyond the ends of the plastic panel; these exposed ends are placed side by side and twisted together to form a shank 324 for retaining the panel in the shape into which it has been transformed by bending and for mounting the applicator in a handle.

FIG. 63 illustrates an applicator 326 in which the panel is again bent into a U, with one leg 328 repeatedly twisted along its axis and the other leg 330 bent into the shape of an open helix. Again, the metal insert has exposed opposite ends which are twisted together to form a shank 332 for the same purposes as shank 324 of applicator 320 described above.

Figure 64:
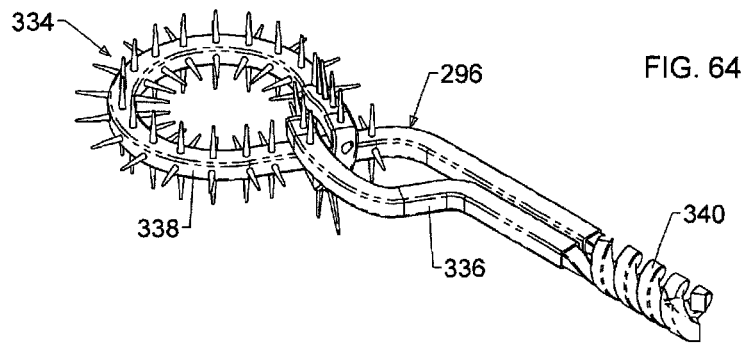
Figure 65:
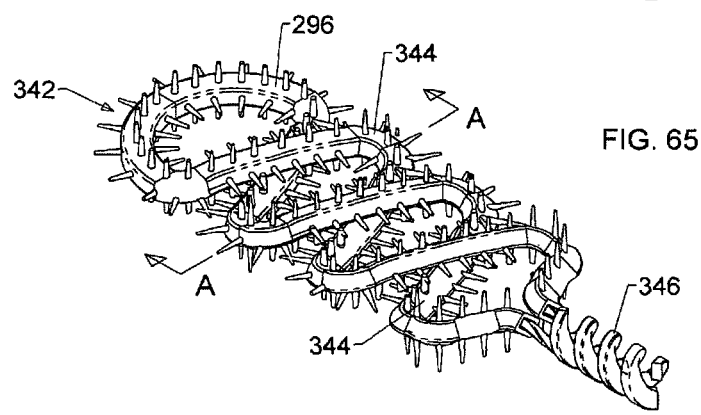
Figure 66:
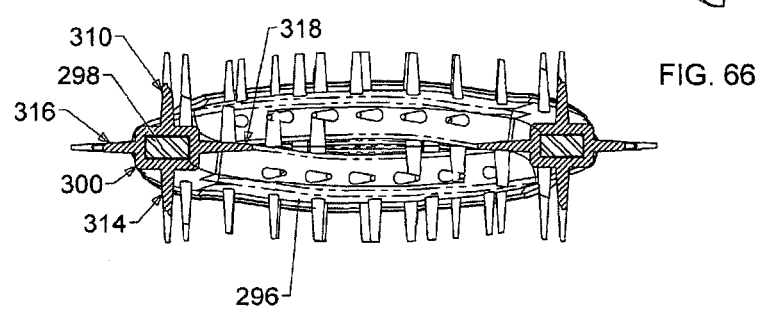
FIG. 66 is an enlarged cross-sectional view taken along line A-A of FIG. 65.
Figure 76:
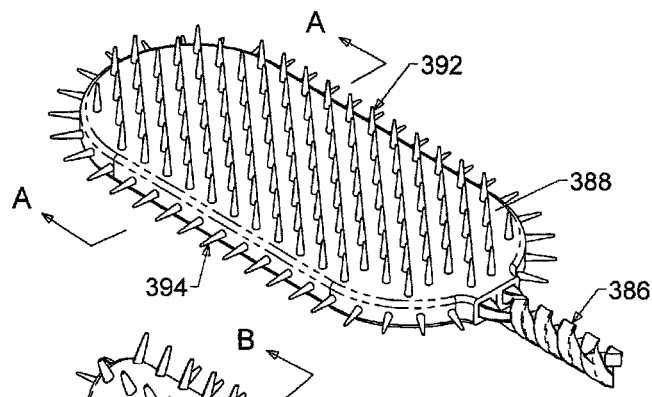
FIG. 76 is a perspective view of another panel for use in making an applicator in accordance with the invention.

In the applicator 334 of FIG. 64, the band 296 is first formed into a U, and one leg 336 of the U is then knotted over the other leg 338 by bending to form a loop. Exposed ends of the metal insert are twisted together to form a shank 340. The applicator 342 of FIGS. 65 and 66 has a succession of criss-cross bends 344 imparted to the legs of a U into which band 296 is initially bent, and once more the exposed ends of the metal insert are twisted together to form a shank 346.

FIGS. 67 and 68 illustrate a modified molded plastic panel 296a similar to but wider than the panel 296 of FIGS. 60-61, having an elongated malleable metal insert 298a (correspondingly similar to but wider than the insert 298 of FIGS. 60 and 61) completely laterally surrounded by molded plastic panel body 300a. This panel 296a bears four rows of projections 310a extending from its upper surface 302a and four rows of projections 314a extending from its lower surface 304a rather than the single rows of projections 310 and 314 in the panel 296, although the lateral edge projections 316a and 318a (initially lying in the mold plane) are still single rows to permit separation of the mold plates in the common pull direction. As shown, different rows of projections 310a and 314a may be somewhat divergent, but still are oriented substantially in the common pull direction so long as their angles of divergence are sufficiently small, and the projections are sufficiently flexible, to enable ready separation of the mold plates and removal of the panel from the mold at the end of the molding operation. After molding, the panel is bendable (as indicated at 348 in FIG. 68) and twistable (as indicated by twist 350 and reverse twist 352 in FIG. 68) so that it can be transformed into an applicator of any of a variety of configurations, with the relative orientation of at least some of the projections altered by the twisting and bending. The projections are illustrated as bristles, but other forms of molded features can be provided.

FIGS. 69 and 70 illustrate another modified molded panel 296b, generally similar in configuration and dimensions to the panel 296a of FIGS. 67-68 but differing therefrom in that the single wide metal insert 298a is replaced by a plurality of parallel wire-shaped elongated metal inserts 298b (two being shown in the drawings). Again, the opposed surfaces 302b and 304b respectively bear multiple rows of projections 310b and 314b oriented substantially in a common pull direction, while the edges bear single rows of projections 316b and 318b initially lying in the mold plane. Like the panel 296a, panel 296b may be bent (as indicated at 354 in FIG. 70) and twistable (as indicated by twist 356 and reverse twist 358 in FIG. 70) so that it can be transformed into an applicator of any of a variety of configurations, with the relative orientation of at least some of the projections altered by the twisting and bending. Once more the projections are illustrated as bristles, but other forms of molded features can be provided.

FIGS. 71-83 show further embodiments of the applicator of the invention which, like the embodiments of FIGS. 60-70, are produced from plastic panels molded around elongated malleable metal inserts and having projections lying in the mold plane as well as projections oriented substantially in a common pull direction. In these embodiments, however, the metal insert is bent to form a laterally as well as longitudinally extended support before the plastic is molded, so that the molded panel does not have the configuration of a band (as in FIGS. 60-70) but at least in portions has substantial width, being transformed into an applicator by a bending operation (e.g., a folding operation) after the molding step.

A first such applicator, illustrated in FIGS. 71-75C, has a panel formed around an elongated malleable metal insert 360, which may be similar to the insert 298 of FIGS. 60-61 but is initially bent into a planar double-looped configuration, forming an extended support 362 as shown in FIG. 71, with the two ends of the insert remaining untwisted. This insert is then placed in a mold cavity and plastic is molded around it to produce the projection-bearing plastic panel 366 of FIG. 72, wherein projections 368 extending from one surface of the panel are oriented substantially in a common pull direction, and projections 370 extending from edges of the panel lie initially in the mold plane indicated by line PL-PL in FIGS. 73A, 73B and 73C. As seen in FIGS. 72 and 73A-73C, the mold cavity is so shaped that the molded plastic completely surrounds the insert 360 in distal loop 372 but leaves a central opening in the panel, while spanning proximal loop 374 to provide a wide portion of the panel, and also spanning the gap between spaced parallel portions 376 of the insert intermediate the loops. Finally, the panel is bent (folded) about a longitudinal center line 378 (FIGS. 74-75C) and the exposed wire is twisted to form the shank, being thereby transformed into an applicator 380 in which the relative orientations of many of the projections are changed from the as-molded state.

Figure 79:
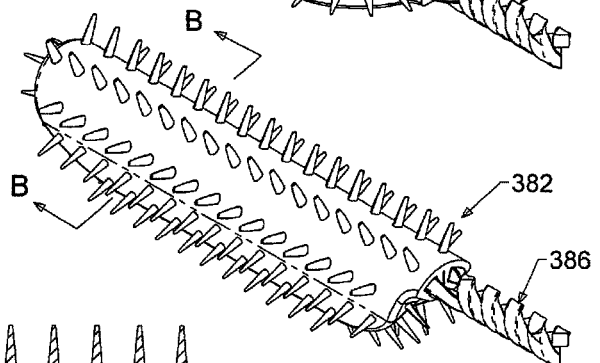
FIG. 79 is a perspective view of an applicator embodying the invention, produced by bending or folding the panel of FIG. 76.
Figure 77:
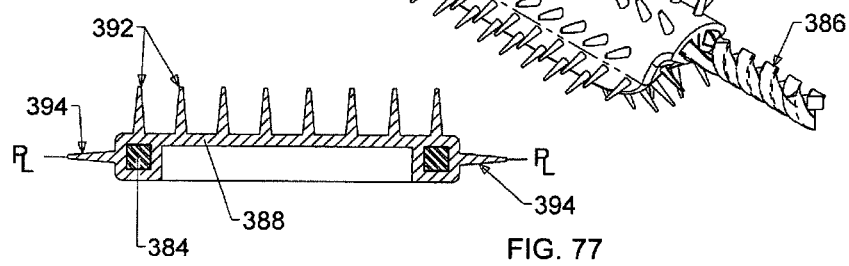
FIG. 77 is a sectional view taken along line A-A of FIG. 76.
Figure 78:
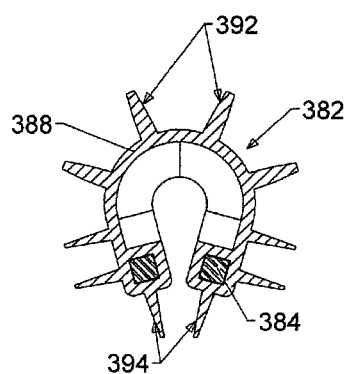
FIG. 78 is a sectional view taken along line B-B of FIG. 79.
Figure 80:
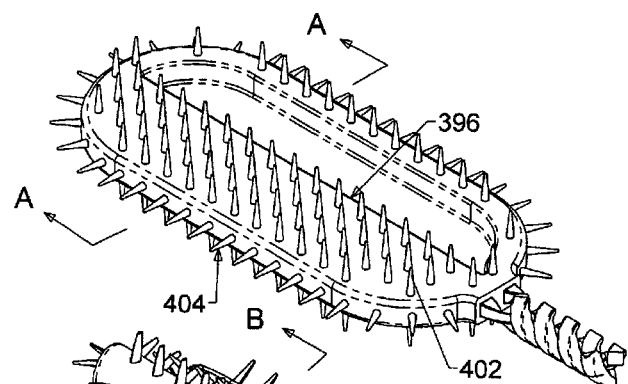
FIG. 80 is a perspective view of a further panel for use in making an applicator in accordance with the invention.
Figure 82:
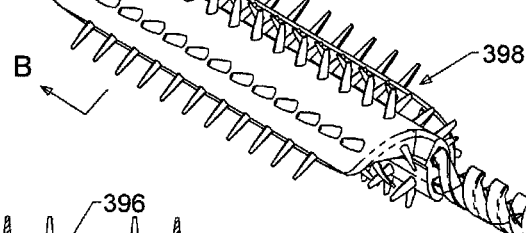
FIG. 82 is a perspective view of an applicator embodying the invention, produced by bending or folding the panel of FIG. 80.

In the applicator 382 of FIGS. 76-79, an elongated malleable metal insert 384 is bent to form a single elongated and parallel-sided planar loop, with the ends of the insert twisted together to provide a shank 386, prior to molding. The bent insert is placed into a mold cavity, and a generally planar plastic panel 388 is molded around it, spanning the entire loop and bearing projections 392 oriented substantially in a common pull direction as well as projections 394 lying in the mold plane PL-PL (FIG. 77). The molded panel is bent around a longitudinal center line to form an applicator of generally curved cross-section as shown in FIG. 79.

Figure 81:
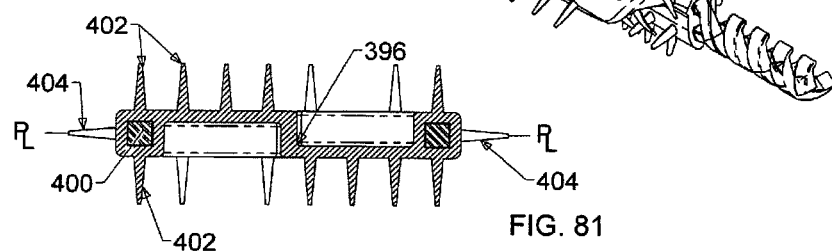
FIG. 81 is a sectional view taken along line A-A of FIG. 80.
Figure 83:
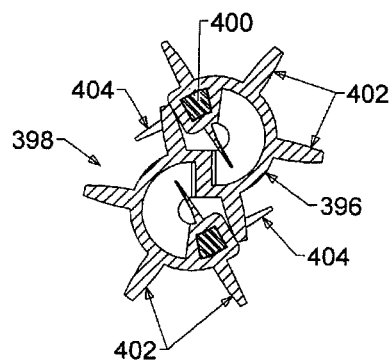
FIG. 83 is a sectional view taken along line B-B of FIG. 82.

The panel 396 of the applicator 398 of FIGS. 80-83 is molded with a right-angled Z-shaped cross-section similar to that of panel 142 of FIG. 27. The elongated malleable metal insert 400 in this embodiment is formed, prior to molding of the panel, into a single straight-sided planar loop corresponding to that of the above-described panel shown in FIG. 76, and placed into a mold cavity where the plastic panel of Z-shaped cross section is formed, spanning the loop and bearing both projections 402 oriented substantially in a common pull direction and projections 404 lying in the mold plane PL-PL (FIG. 81). The panel is then transformed, by bending about a longitudinal center line, into the final applicator configuration of FIGS. 82-83.

FIGS. 84-91 illustrate another applicator 406, also embodying the invention. Like the applicators of FIGS. 76-79 and 80-83, this applicator includes an elongated malleable metal insert 408 which is first bent into a single elongated and straight-sided planar loop and then placed in a mold cavity where a plastic panel 412 is formed, spanning the loop. Afterwards, its ends are twisted together to form a shank 410. The panel 412 differs from those of the embodiments just described, however, in that the features formed by molding are not projections but openings 414, oriented in a common pull direction (the orientation of an opening being that of the axis between its open ends) and elongated transversely so as to divide the loop-spanning portion of the panel into a multiplicity of spaced parallel bars 416 spanning the loop from side to side thereof. After molding, the panel looped insert and panel 412 are first bent (folded) along a longitudinal center line 418 (FIGS. 85-88) with the effect of folding the bars 416 at their midpoints into parallel projections. A final downward bend imparted to the distal end 420 of the loop completes the transformation of the panel 414 into the comb-like applicator shown in FIGS. 89-91.

Figure 93:
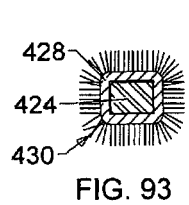
FIG. 93 is a cross-sectional view of one run of the applicator of FIG. 92.
Figure 94:
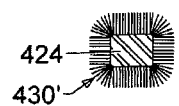
FIG. 94 is a view, similar to FIG. 93, of a modified form of the applicator of FIG. 92.
Figure 92:
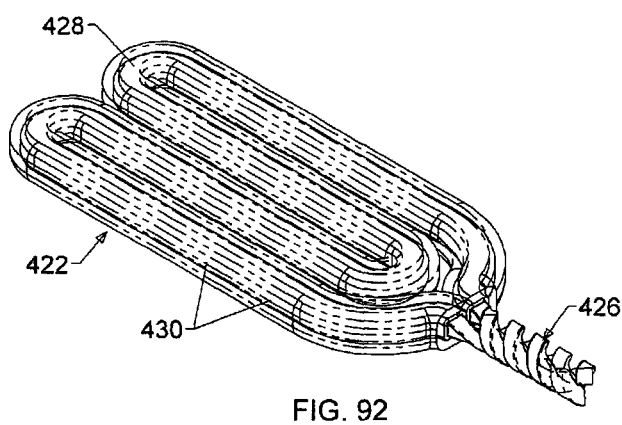
FIG. 92 is a perspective view of another applicator embodying the invention.

A still further applicator 422, illustrated in FIGS. 92 and 93, has an elongated malleable metal insert 424 bent to form a planar U with two runs of the insert constituting each leg of the U, and the ends of the insert twisted to form a shank 426. This insert is placed in a mold cavity where a layer of plastic 428 is molded around each run of the insert without spanning any gap between runs, and flocking 430 is applied to the molded plastic. Alternatively, as FIG. 94 shows, the flocking 430' may be applied and adhered directly to the surfaces of the insert 424, omitting the molding step and the plastic layer. The flocking, in these applicators, serves as an alternative to features such as projections or openings molded in a plastic panel.

As mentioned above, another alternative to the molding of plastic projections or bristles integrally with the panels is the attachment of tufts of bristles to the panels. Examples of bristle-attaching procedures are illustrated in FIGS. 95-103.

Figure 95:
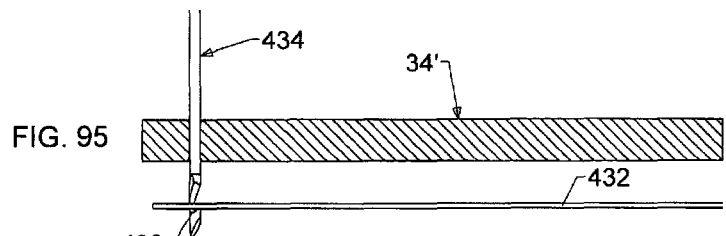
FIGS. 95, 96 and 97 are schematic side sectional views illustrating successive stages of forming tufts of bristles along a limb of an applicator of the general type shown in FIGS. 5-12.
Figure 96:
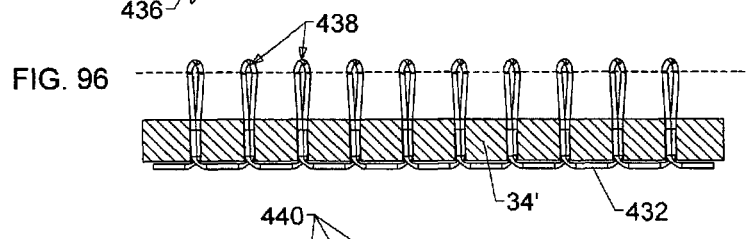
Figure 97:
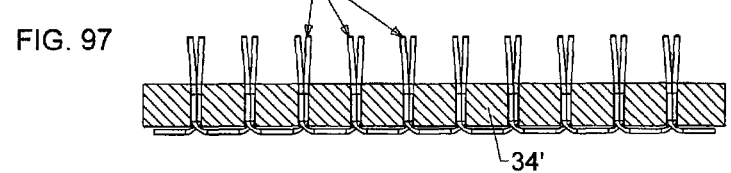
Figure 98:
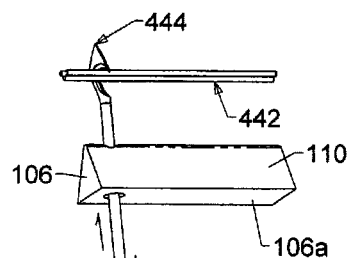
FIGS. 98, 99 and 100 are schematic side sectional views in illustration of successive stages of one embodiment of procedure for forming tufts of bristles along a limb of an applicator of the general type shown in FIGS. 18 and 20-21.
Figure 99:
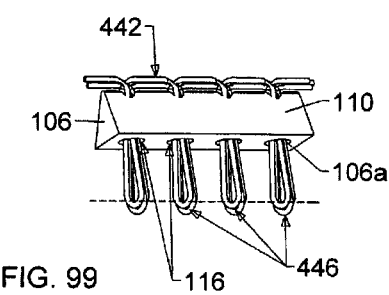
Figure 100:
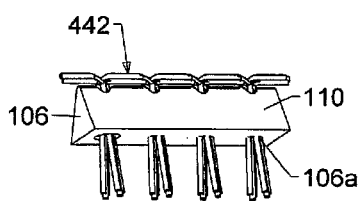

In FIGS. 95-97, 34' designates a limb of a panel of the general type shown in FIGS. 5-7 but molded without projections. To provide a row of tufts of bristles along this limb, a plurality of parallel elongate strands 432 of bristle fibers such as nylon fibers are disposed beneath the limb 34', extending parallel thereto. A needle 434 with a hooked end 436 is passed through the limb, from the side opposite to the strands of fibers, so that the hooked end engages the fibers (FIG. 95). The needle is then pulled back up through the limb, bringing a loop 438 of the fiber strands with it. When the loop 438 reaches a sufficient height above the limb, the hook is disengaged and moved along the limb to the intended location of another fiber loop. These steps are repeated until a desired number of spaced loops 438 has been provided along the limb (FIG. 96). Finally, the tops of the loops are trimmed off (FIG. 97), leaving an array of tufts 440 of bristles projecting upwardly from the limb.

The procedures shown respectively in FIGS. 98-100 and 101-103 are illustrated as used with an applicator of the type shown above in FIGS. 18 and 20-21, but may be adapted to many embodiments of the invention. Thus, in FIG. 98 there is shown one of the ribs 110 of the inner panel 106 of the applicator of FIGS. 18 and 20-21, with a set of elongated, generally parallel strands 442 of nylon or other bristle fiber disposed along and above the apex of the rib. As in the procedure of FIGS. 95-97, hooked needle 444 is passed upwardly through the panel rib to engage the fiber strands (FIG. 98) and pull a loop 446 of the strands back down through the rib until the loop projects from the flat lower surface 106a of the panel 106. These steps are repeated along the length of the rib, and then along the length of each other rib of the panel 106, to provide an array of loops 446 (FIG. 99) projecting from the panel surface 106a; the ends of the loops are then trimmed off (FIG. 100), leaving an array of tufts of fibers.

Figure 101:
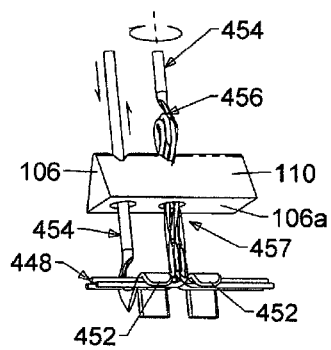
FIGS. 101, 102 and 103 are schematic side sectional views in illustration of successive stages of another embodiment of procedure for forming tufts of bristles along a limb of an applicator of the general type shown in FIGS. 18 and 20-21.
Figure 102:
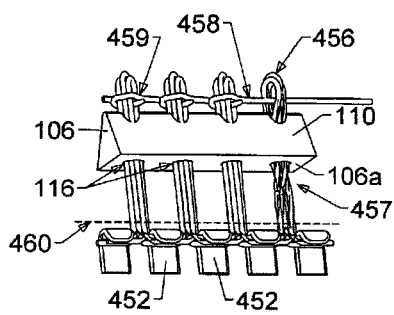
Figure 103:
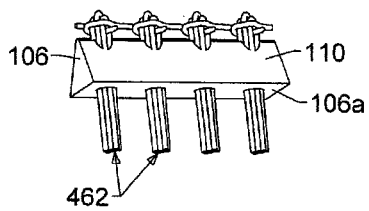

In the alternative procedure of FIGS. 101-103, a set of elongated parallel strands of bristle fibers 448 is disposed beneath the flat lower surface 106a of panel 106, parallel to one of the ribs 110, and is kept in place by a succession of spaced holders 452 spaced below the panel surface 106a. A hooked needle 454 is inserted downwardly through the last-mentioned rib 110 to engage the strands and pull them upwardly through the rib, forming a loop 456 above the rib; loop 456 may optionally be twisted during formation, as indicated at 457 in FIG. 101. As these steps are repeated along the rib, a retaining strand 458 is threaded through the successively formed loops 456, which, if initially twisted, may optionally be untwisted after the retaining strand passes through them, as indicated at 459 in FIG. 102. Finally, the fibers are trimmed at a location 460 below panel surface 106a (FIG. 102), leaving an array of fiber tufts 462 projecting through that surface (FIG. 103).

In each of the foregoing procedures, if the panel 106 is formed with holes 116 (FIG. 21) during the molding operation, the needle 444 or 454 is simply passed back and forth through each of these holes in succession, establishing a tuft of fibers at the location of each hole. If there are no such holes, the needle is designed to pierce the panel 106 as it is initially inserted therethrough at each tuft-forming location.

The invention additionally contemplates the provision of applicators having projections (bristles) having any of a variety of different cross-sections. As one exemplary but non-limiting alternative to conventional cylindrical-cross-section molded bristles, the bristles may be elliptical in cross-section and oriented with their long cross-sectional axes at any desired angle from 0° to 90° relative to the direction of wiping, i.e., the direction in which the applicator is withdrawn from a mascara container while being engaged by a wiper element (to remove excess mascara) in the container neck.

Figures 104, 105:
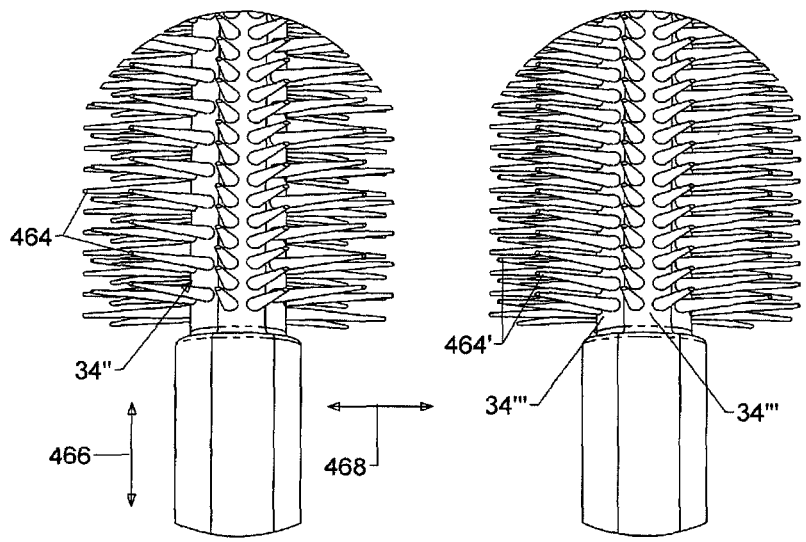
FIGS. 104 and 105 are enlarged fragmentary isometric views of an applicator of the type shown in FIG. 7, illustrating a modified bristle configuration and respectively showing two different bristle arrangements.

An illustrative embodiment of an applicator of the invention incorporating elliptical-cross-section bristles is illustrated in FIG. 104. In this applicator, which is of the general type shown in FIGS. 5-7 above, the bristles 464 are, as stated, elliptical in cross-section, and are oriented with the long axes of their elliptical cross-sections at 90° to the long axis of the applicator, which is parallel to the wiping direction represented by arrow 466. Thus, they are relatively flexible in the direction in which they pass through the wiper orifice, facilitating the wiping operation. When the applicator, laden with mascara, is brought to a user's eyelashes, however, the direction of application (arrow 468) is perpendicular to the direction of wiping. The long axis of the bristle cross-section is parallel to this direction of application, so that (as desired for applying mascara and combing through the lashes) the bristles are more rigid when passing through the lashes than they are when passing through the wiper.

Figure 106:
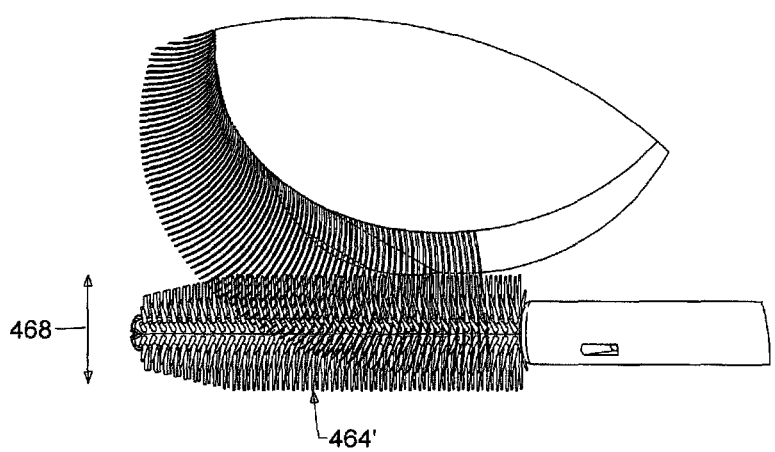
FIG. 106 is a view illustrating the applicator of FIG. 105 in use, applying mascara to eyelashes.

In FIG. 104, each limb 34" of the applicator panel bears two parallel rows of bristles, but the rows of bristles on adjacent limb are alternating or staggered. FIG. 105 illustrates another, otherwise similar applicator, in which the rows of elliptical-cross-section bristles 464' on adjacent limbs 34''' are aligned with each other. FIG. 106 illustrates schematically the bristles 464' of the applicator of FIG. 105 passing through the eyelashes of a user to apply mascara.

FIG. 107 shows a band-shaped panel 470 of the same general type as that of FIG. 40, but with molded projections (bristles) 472 having elliptical cross-sections. When this panel is twisted to form a helix and thereby to constitute an applicator 474 as shown in FIG. 108, the bristles 472 are so oriented that the long axes of their elliptical cross-sections are at 90° to the wiping direction (arrow 476), with the same effects as in the case of the applicators of FIGS. 104 and 105. More generally, bristles with non-circular (e.g. elliptical) cross-sections may be provided on applicators such as mascara brushes generally, to enhance the performance of wiping, applying, combing and/or other functions thereof.

It is to be understood that the invention is not limited to the features and embodiments hereinabove specifically set forth, but may be carried out in other ways without departure from its spirit.

What is claimed is:

1. A molded plastic applicator for cosmetics, comprising:
    (a) an integral molded plastic panel lying substantially in a mold plane when formed and bent out of the mold plane to surround an extended longitudinal axis;
    (b) a plurality of features formed in or on the panel, oriented substantially in a common pull direction transverse to the mold plane when the panel lies in the mold plane and oriented substantially radially of the longitudinal axis in directions distributed around the axis when the panel is bent to surround the axis; and
    (c) further including a retainer holding the panel bent out of the plane in surrounding relation to the axis;
    wherein said panel is sufficiently flexible so as to be bent around said axis with substantially continuous surface curvature, and said features are projections formed on and extending outwardly from the bent panel,
    wherein said panel comprises an elongated band having a surface, said features are projections extending from said surface, and said band is bent into a helix around said axis with said surface facing outwardly, and
    wherein said retainer comprises a wire extending longitudinally through said band, said wire being twisted helically to form and maintain said helix and said band being molded around said wire.

2. A molded plastic applicator for cosmetics, comprising a plastic panel molded around an elongated bendable and shape-holding insert, the panel initially lying substantially in a mold plane and being transformed to a bent configuration at least partially out of the mold plane by bending the insert, and a plurality of features formed in or on the panel, initially oriented in at least one of (i) a substantially common pull direction transverse to the mold plane and (ii) the mold plane, at least some of the features being reoriented relative to others of the features when the panel is transformed to the bent configuration, wherein the insert is a wire having opposed ends, and the panel is transformed into the bent configuration by a process comprising bending the wire into substantially a U shape having substantially parallel legs and twisting the legs about each other, and wherein the features are bristles projecting from the panel and have greater flexibility in a first direction transverse to their lengths than in a second direction transverse to their lengths.

* * * * *